United States Patent
Iki et al.

(10) Patent No.: US 6,835,955 B2
(45) Date of Patent: Dec. 28, 2004

(54) ELECTRO-OPTICAL DEVICE AND ELECTRONIC APPARATUS

(75) Inventors: Takunori Iki, Suwa (JP); Yoshifumi Tsunekawa, Chino (JP); Tomohiko Hayashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/695,903

(22) Filed: Oct. 30, 2003

(65) Prior Publication Data

US 2004/0145541 A1 Jul. 29, 2004

(30) Foreign Application Priority Data

Oct. 31, 2002 (JP) ........................................ 2002-318543
Sep. 12, 2003 (JP) ........................................ 2003-321793

(51) Int. Cl.[7] ............................................... H01L 29/04
(52) U.S. Cl. ............................................ 257/72; 257/59
(58) Field of Search ...................................... 257/59, 72

(56) References Cited

FOREIGN PATENT DOCUMENTS

JP          A 2002-156652          5/2002

*Primary Examiner*—Fetsum Abraham
(74) *Attorney, Agent, or Firm*—Oliff & Berridge, PLC

(57) ABSTRACT

An electro-optical device includes, above a substrate, data lines extending in a first direction, scanning lines which extend in a second direction and which cross the data lines, pixel electrodes and thin film transistors disposed so as to correspond to regions in which the data lines and the scanning lines cross, storage capacitors electrically connected to the thin film transistors and the pixel electrodes, and a shield layer disposed between the data lines and the pixel electrodes. An upper electrode and a lower electrode between which a dielectric film forming each storage capacitor is supported including a first portion laminated along a plane parallel with one surface of the substrate and a second portion laminated along a plane orthogonal to the surface of the substrate, the sectional shape of the capacitor including a projecting shape.

20 Claims, 16 Drawing Sheets

ELECTRO-OPTICAL DEVICE AND ELECTRONIC APPARATUS

BACKGROUND OF THE INVENTION

1. Field of Invention

The present invention relates to technical fields of electro-optical devices and electronic apparatuses, and in particular to, technical fields of an electro-optical device including storage capacitors for improving potential-maintaining characteristics of pixel electrodes, and an electronic apparatus including the electro-optical device. Also, the present invention relates to technical fields of electrophoresis devices, such as electronic paper, EL (electroluminescent) devices, devices using electron emission elements (Field Emission Display and Surface-Conduction Electron-Emitter Display), etc.

2. Description of Related Art

An electro-optical device is known which includes pixel electrodes arranged in a matrix, thin film transistors (hereinafter referred to as "TFTs",) respectively connected to the electrodes, and scanning lines and data lines which are provided in parallel to row and column directions, whereby so-called active-matrix driving can be performed. This electro-optical device further includes a TFT array substrate on which the above pixel electrodes, the TFTs, etc., are formed, an opposing substrate on which a common electrode opposed to the array substrate is formed, and electro-optical material, such as liquid crystal provided between both substrates, whereby a picture can be displayed. Specifically, in active matrix driving, each predetermined picture signal is written in the predetermined pixel electrode, whereby an electric field corresponding to the picture signal is applied and changes the state of each pixel, thus changing the transmission factor of light. For example, see Patent Document 1.

In this case, for example, when the scanning lines are provided, a predetermined time is required, from a state in which TFTs connected to one scanning line are switched on to a state in which the TFTs are next switched on, until selection of all the scanning lines is completed. In addition, since a voltage applied to the pixel electrodes and the electro-optical material, such as liquid crystal, is attenuated in the predetermined time, the picture is affected, although the state is unchanged.

Accordingly, an electro-optical device of the related art may include a storage capacitor on the TFT array substrate, in addition to the above components. This is a capacitor which includes a pair of substrates having a dielectric film provided therebetween and in which, simultaneously with the application of picture signals to pixel electrodes and the application of a predetermined electric field to electro-optical material, such as liquid crystal, an equal electric field is applied to the capacitor. By utilizing this storage capacitor, during the selection period for all the scanning lines, as described above, typically, in, for example, one field, the electric field to the electrical material, such as liquid crystal can be maintained as it was originally applied. Thus, a high quality picture can be displayed.

Nevertheless, the electro-optical device of the related art has a problem in that the storage capacitance cannot be set sufficiently large. When the storage capacitance cannot be set sufficiently large, maintenance of the electric field applied to the electro-optical material, such as liquid crystal cannot sufficiently be performed during the all selection period, thus causing display non-uniformity, flickering, etc., in a picture.

Although there are demands to increase the storage capacitance in order to cope with the above problem, it is difficult to satisfy these demands as size reduction, increased resolution, or increased aperture ratio of the electro-optical device advances. By way of example, to simply realize an increase in storage capacitance, it is possible to attempt to increase the areas of upper and lower electrodes, etc., constituting the storage capacitor. However, in this case, it is impossible for the electro-optical device to cope with the fundamental demand to display a bright picture since a decrease in the aperture ratio is inevitable.

In addition, although, to achieve increased storage capacitance, it is possible to reduce the distance between the upper electrode and the lower electrode, that is, to make a dielectric film thin, such attempts have already reached their limit since, even in the present circumstances, large reductions in the thickness of the dielectric film have already been made.

SUMMARY OF THE INVENTION

The present invention is made to address the above problems, and provides an electro-optical device in which a high quality picture free from display non-uniformity, flickering, etc., can be displayed, with increased storage capacitance while maintaining a high aperture ratio, and an electronic apparatus including the electro-optical device.

To address the above problem, a first electro-optical device of an aspect of the present invention includes data lines extending in a first direction above a substrate, scanning lines which extend in a second direction and which cross the data lines, pixel electrodes and thin film transistors disposed so as to correspond to regions in which the data lines and the scanning lines cross, storage capacitors electrically connected to the thin film transistors and the pixel electrodes, and a shield layer disposed between the data lines and the pixel electrodes. An upper electrode and a lower electrode between which a dielectric film forming each storage capacitor is supported include a first portion laminated along a plane parallel with one surface of the substrate and a second portion laminated along a plane orthogonal to the surface of the substrate, whereby the sectional shape of the capacitor includes a projecting shape.

According to the first electro-optical device of an aspect of the present invention, firstly, scanning lines, data lines, pixel electrodes, and thin film transistors are provided, whereby active-matrix driving can be performed. Also, in the above electro-optical device, each of the above components of various types forms part of a laminated structure, whereby size reduction of the entire device can be achieved, and appropriate disposition of the components is realized, whereby a pixel aperture rate can be increased. Also, provision of a shield layer between each data line and each pixel electrode can reduce or prevent capacitive coupling from occurring between both. In other words, power supply to the data lines can reduce a possibility that a potential change in the pixel electrode, etc., occur, thus enabling display of a high quality picture. In addition, in an aspect of the present invention, a storage capacitor is provided which is formed by an upper electrode and a lower electrode between which a dielectric film is provided, and in which one of the upper electrode and the lower electrode is connected to the pixel electrode. Accordingly, when an electric field corresponding to the picture signal is applied to the pixel electrode, the same electric field is stored in the storage capacitor. Therefore, an electric field applied to liquid crystal can be maintained in a predetermined period. Thus, according to an aspect of the present invention, a high quality picture free from flickering, etc., can be displayed.

Here, in particular, in an aspect of the present invention, the storage capacitor includes a first portion laminated along a plane parallel to one surface of the substrate, with the dielectric film provided between the upper electrode and the lower electrode, and a second portion laminated along a plane orthogonal to the surface of the substrate, whereby the sectional shape of the capacitor includes a projecting shape. In other words, for example, in accordance with a case, such as the formation of the lower electrode so that it includes a projecting portion from the substrate, or the formation of a projecting member in a predetermined position below the lower electrode, the dielectric film and the upper electrode which are positioned above has a bending shape in a sectional view. In this case, compared with a plane storage capacitor of the related art, an operation and advantage of an increase in capacitance is expected for only the area of the second portion which is laminated along a plane orthogonal to the surface of the substrate, and in which the upper electrode, the dielectric film, and the lower electrode are laminated, that is, the area of a side wall having a projecting shape.

Accordingly, in an aspect of the present invention, the capacitance of the storage capacitor can be increased without increasing the two-dimensional areas of the upper electrode and the lower electrode constituting the storage capacitor. Thus, an increase in the storage capacitance is realized, whereby a high quality picture free from display non-uniformity, flickering, etc., can be displayed.

Moreover, in the present invention, the dielectric film constituting each storage capacitor may include a plurality of layers including different materials, and may constitute a laminated body including one of the layers which includes a material having a dielectric constant higher than those of the other layers. Thus, the charge-storage characteristics of the storage capacitor can be more enhanced.

Also, this point greatly contributes to high quality picture display in the electro-optical device of an aspect of the present invention.

A form in which the sectional shape of the storage capacitor includes the projecting shape is realized, as described above, by the formation of the lower electrode so as to include a projecting portion, and the formation of a projecting member below the lower electrode. However, in an aspect of the present invention, the form may be realized using any suitable device or method. For example, in a case in which some wires and circuit elements, etc., are formed below the lower electrode, and an interlayer insulating film is formed on them, when the surface of the interlayer insulating film has a difference in level in accordance with the height of each of the wires and circuit elements, etc., it is possible that the difference in level be used as a base for the second portion or the projecting shape. In other words, in this case, by sequentially forming the lower electrode, the dielectric film, and the upper electrode, on the difference in level, a storage capacitor whose sectional shape naturally includes a projecting shape can be formed.

Depending on the circumstance, a form maybe employed in which a depression is formed in the interlayer insulating film on the substrate, the lower electrode and the dielectric film are formed to cover the depression. The upper electrode is formed so as to fill in the depression and to cover the surface of the interlayer insulating film.

Moreover, in an aspect of the present invention, one of the upper electrode or the lower electrode, which constitute the storage capacitor, is connected to the pixel electrode, thereby having a potential equal to that in the pixel electrode. In this case, it is preferable that the other electrode, which is not connected to the pixel electrode, has a fixed potential. In this case, the upper electrode or the lower electrode, which is connected to the pixel electrode, can be generally called the "pixel-potential capacitor electrode", and the other electrode can be called the "fixed-potential capacitor electrode". Here, an electrode connected to the pixel electrode may be either an upper or lower electrode. Thus, regarding the more actual configuration of the storage capacitor, a laminated structure may be employed which is composed of the pixel-potential capacitor electrode, the dielectric film, and the fixed-potential capacitor electrode on the substrate in sequential order from the bottom, or the structure having a reverse order may be employed.

In connection with the above, the above fixed-potential capacitor electrode may be formed as part of a capacitor line formed along the direction in which the scanning lines extend. This enables the time or cost required for production to be reduced. This is because, although the formation of separately forming fixed-potential capacitor electrodes to be separate or isolated on the substrate requires provision of wires for each electrode, by forming each fixed-potential capacitor electrode as part of the capacitor "line" since the fixed-potential capacitor electrode only needs to have a fixed potential, one wire may be provided for the capacitor line, and a production cost can be correspondingly reduced.

In addition, as material for the above upper electrode and lower electrode, basically, any material may be selected. Preferably, for example, one of the upper electrode and the lower electrode may be formed of a light shielding material. This enables the upper electrode or the lower electrode to undertake the role of a light shielding layer for preventing light from being incident on the channel region of each thin film transistor. Thus, the generation of a light leakage current in the channel region is suppressed, whereby a high quality picture can be displayed in which flickering, etc., caused by the current, do not occur.

Moreover, the "high dielectric constant material" in the present invention includes insulating material or the like which includes, not only silicon nitride, which is described later, but also at least one of the group including TaOx (tantalum oxide), BST (strontium barium titanate), PZT (zirconate titanate), $TiO_2$ (titanium oxide), $ZiO_2$ (zirconium oxide), $HfO_2$ (hafnium oxide), SiON (silicon oxynitride), and SiN (silicon nitride). In particular, by using high dielectric constant materials of TaOx, BST, PZT, $TiO_2$, $ZiO_2$ and $HfO_2$, capacitance in a limited region on the substrate can be increased. Alternatively, by using silicon-included materials of $SiO_2$ (silicon oxide), SiON (silicon oxynitride), and SiN, the generation of a stress in the interlayer insulating film or the like can be reduced.

To address the above problem, a second electro-optical device of an aspect of the present invention includes data lines extending in a first direction above a substrate, scanning lines which extend in a second direction and which cross the data lines, pixel electrodes and thin film transistors disposed so as to correspond to regions in which the data lines and the scanning lines cross, storage capacitors electrically connected to the thin film transistors and the pixel electrodes, and a light shielding film disposed between each data line and each pixel electrode. An upper electrode and a lower electrode, between which a dielectric film forming each storage capacitor is supported, include a first portion laminated along a plane parallel with one surface of the substrate and a second portion laminated along a plane orthogonal to the surface of the substrate, whereby the sectional shape of the capacitor includes a projecting shape.

According to a second aspect of an electro-optical device of the invention, a light shielding film is provided instead of the shield layer in the above first electro-optical device. Therefore, the presence of the light shielding film increases the light shielding feature of the thin film transistor, whereby the generation of a light leakage current, the generation of flickering caused by the current, etc., can be reduced.

Also, by forming the storage capacitor so as to be confined in a light shielding region defined by the light shielding film, the aperture ratio can be maintained at a high level.

According to this aspect, the sectional shape of the storage capacitor includes a projecting shape despite the maintenance of the high aperture ratio, whereby the capacitance can be increased.

A form may be employed in which the light shielding film and the above shield layer in the present invention coexist, or in which a member having the functions of both, that is, a light-shielding-film-and-shield-layer is provided.

In an aspect of the first electro-optical device of the present invention, the shield layer is electrically connected to the upper electrode of the storage capacitor.

According to this aspect, the shield layer and the upper electrode of the storage capacitor have equal potentials. More specifically, both can be maintained so as to have the same fixed potential. According to this, by connecting either one to a power supply to supply a fixed potential, the other one can simultaneously have the fixed potential. Thus, simplification, etc., of a device configuration are realized. Also, the laminated structure can be optimized.

In another aspect of the first electro-optical device and an aspect of the second electro-optical device in the present invention, the projecting shape is formed, such that the lower electrode is formed so as to include a projecting portion from the substrate.

According to this aspect, the lower electrode itself is formed so as to include the projecting portion, whereby a storage capacitor according to the present invention which includes a projecting shape can be relatively easily formed. In other words, in this case, the formation of the lower electrode in a form integrated with the projecting portion in a lower electrode forming process so as to include the projecting portion, that is, the formation of the projecting portion as the same film for the lower electrode, can be performed. Thus, a production step can be simplified.

More specifically, the formation of the lower electrode including the projecting shape can be performed by after an original film to become the lower electrode in the future is formed, a resist film is formed on only a portion to be left as a projecting shape in the original film, and etching thereon is implemented.

In another aspect of the first or second electro-optical device of the present invention, the projecting shape is formed by forming a projecting member below the lower electrode.

According to this aspect, as described above, the lower electrode is not formed so as to include the projecting portion, but, a projecting member separated therefrom is formed below the lower electrode, whereby the projecting shape is formed. Therefore, this case may have a form in which the material for the lower electrode and the material for the projecting member are set to differ.

Also, in another aspect of the first or second electro-optical device of the present invention, the lower electrode may be formed of a light absorbing conductive material.

According to this aspect, the lower electrode, which is a thick film, can increase a light absorbing effect.

In another aspect of the first or second electro-optical device of the present invention, the projecting shape includes a tapered shape.

According to this aspect, good formation of the dielectric film and the upper electrode to be formed on the lower electrode can be performed. In other words, when the projecting shape includes the tapered shape, one corner of the projecting shape is smoothed, as is clear from comparison with, for example, a projecting shape having a perpendicular side wall. Thus, in the formation of the dielectric film and the upper electrode on the projecting shape including the tapered shape, there is almost no need of concern about deterioration in coverage, etc. Therefore, according to this aspect, good formation of the dielectric film and the upper electrode can be performed.

Also, in the case of comparison between a projecting shape including a perpendicular side wall and the projecting shape according to this aspect, which includes the tapered shape, when it is assumed that the heights of both are equal and the areas of the top surfaces of the projecting shapes are equal, in general, the area of the side wall is larger in the latter than in the former. Thus, the latter is preferable in a storage capacitance increasing point.

In another aspect of the first or second electro-optical device of the present invention, the height of the projecting shape is 50 to 1000 nm.

According to this aspect, the capacitance of the dielectric film can be increased at least approximately 1.5 times a reference value of a plane storage capacitor of the related art, although it differs depending on various conditions, such as a point in which what material is used to form the dielectric film. Therefore, according to this aspect, for the increase, a potential holding characteristic can be enhanced, thus enabling reduction in the generations of display non-uniformity, flickering, etc., in a picture.

According to another aspect of the electro-optical device of the present invention, the pixel electrodes are arranged in a matrix, the scanning lines and the data lines are formed in light shielding regions corresponding to the matrix, and the storage capacitors are formed in the light shielding regions.

According to this aspect, the formation of the storage capacitors in the light shielding regions can maintain the aperture ratio so as to have a high value. In addition, according to this aspect, the capacitance of the each storage capacitor can be increased, since its sectional shape, includes a projecting shape despite the maintenance of the high aperture ratio.

Therefore, according to this aspect, a bright picture can be displayed, and a high quality picture free from display non-uniformity, flickering, etc., can be displayed.

Each light shielding region is a region in which light contributing to picture display is shielded, and its specific shape differs depending on what shape the above "matrix" has. For example, when the matrix represents a case in which the pixel electrodes are linearly arranged in vertical and horizontal directions, the specific shape of the light shielding regions is a lattice. Aside from this, when the pixel electrodes are arranged in a hound's-tooth-check form in vertical and horizontal directions, the specific shape of the light shielding regions is a shape such, as one in which curved lines bending along edges of the pixel electrodes are arranged in parallel in vertical and horizontal directions.

In another aspect of the first or second electro-optical device of the present invention, the projecting shape of the storage capacitor is formed along at least one of each scanning line and each data line.

According to this aspect, lamination of the interlayer insulating film, etc., on the projecting shape forms a projecting portion on the projecting shape. Thus, a form in which the projecting portion extends along one of the scanning line and the data line appears. Therefore, in this case, a form in which the projecting portion exists between adjacent pixel electrodes appears. Accordingly, in the case of using a 1H inversion driving method, a 1S inversion driving method, or a dot inversion driving method to drive the electro-optical device according to this aspect, an adverse effect on the picture, which is caused by a lateral electric field generated between adjacent pixel electrodes, can be reduced, thus enabling display of a high quality picture. The reason is described below in detail.

In the 1H inversion driving method, for example, when pixel electrodes arranged in a square form are assumed, a state in which, in one frame or field, pixel electrodes arranged in odd-numbered rows thereof are driven by a positive polarity potential, with the potential of a common electrode used as a reference, and pixel electrodes arranged in even-numbered rows are driven by a negative polarity potential, and a state in which, in the subsequent frame or field, conversely, driving is performed so that the negative polarity potential is used for the odd-numbered rows and the positive polarity potential is used for the even-numbered rows, are repeated. Also, the 1S inversion driving method is a driving method that can be understood in a form in which, in the description of the 1H inversion driving method, the odd-numbered rows are replaced by "odd-numbered columns", and the even-numbered rows are replaced by "even-numbered columns". In addition, in the dot inversion driving method, the polarity of a voltage applied to each pixel electrode is inverted between adjacent pixel electrodes in column and row directions. By employing these driving method, deterioration in electro-optical material, such as liquid crystal, which is caused by the application of a direct-current voltage component, or the generation of crosstalk or flickering in the picture can be suppressed.

However, a so-called "lateral electric field" is generated because, in each inversion driving method, pixel electrodes to which voltages having different polarities are applied are adjacent to one another. For example, in the 1H inversion driving method, between pixel electrodes positioned in one row, and pixel electrodes positioned in a row adjacent thereto, a lateral electric field is generated. The generation of the lateral electric field creates disorder in the potential difference (hereinafter referred to as the "longitudinal electric field") between each pixel electrode on the substrate and the common electrode on the opposing substrate, and causes inferior alignment in liquid crystal, so that insufficient light intensity in the corresponding portion occurs, resulting in a deterioration in picture quality, such as a decrease in picture quality.

Accordingly, in this aspect, as described above, the projecting shape of the storage capacitor is formed along one of the scanning line and the data line, whereby the lateral electric field can be reduced or prevented from being generated.

This is because, by forming each pixel electrode so that its edge is on an edge of the projecting portion, the distance between the pixel electrode and the common electrode can be narrowed, whereby the longitudinal electric field can be enhanced compared with the above-described case. Also, this is because the lateral electric field can be weakened, depending on the magnitude of the dielectric constant of the projecting portion, regardless of whether or not the edge of the pixel electrode exists on the projecting portion. In addition, this is because the influence of the lateral electric field on liquid crystal can be relatively reduced since the volume of the gap between the projecting portion and the common electrode, that is, the volume of the liquid crystal in the gap, can be reduced.

Needless to say, in the 1H inversion driving method, it is preferable that the projecting shape or the projecting portion be formed along the scanning line, and in the 1S inversion driving method, it is preferable that the projecting shape or the projecting portion be formed along the data line. Also, in the dot inversion driving method, the projecting shape or the projecting portion be formed along both the scanning line and the data line.

As described above, according to this aspect, good application of the longitudinal electric field to the liquid crystal can be performed, whereby a picture as desired can be displayed.

In another aspect of the first or second electro-optical device of the present invention, the dielectric film includes a silicon oxide film and a silicon nitride film.

According to this aspect, the dielectric film includes a silicon nitride film having a relatively high dielectric constant. Thus, a high charge storage characteristic can be enjoyed, even if the area of the storage capacitor, that is, the area of a pair of electrodes constituting the storage capacitor, is slightly reduced.

This greatly enhances the potential holding characteristic of the pixel electrode, thus enabling display of a high quality picture. Also, the area of the storage capacitor can be further reduced in a plane view, thus enabling a further increase in the aperture ratio.

In addition, since the silicon nitride film has a good operation of stemming infiltration or diffusion of moisture, it can reduce or prevent moisture from infiltrating into the semiconductor layer forming the thin film transistor. In this respect, if moisture infiltrates into the semiconductor layer, the gate insulating film, or the like, positive charge is generated in the interface between the semiconductor layer and the gate insulating layer, thus resulting in an adverse effect in that a threshold voltage gradually increases. In this aspect, as described above, infiltration of moisture into the semiconductor layer can be effectively reduced or prevented, thus enabling reduction or prevention of an occurrence of a problem in that the threshold voltage gradually increases.

In addition, the dielectric film includes a silicon oxide film in addition to the above silicon nitride film, whereby the breakdown characteristic of the storage capacitor does not decrease.

As described above, according to the dielectric film according to this aspect, multiple operations and advantages can be simultaneously enjoyed.

This aspect includes, not only a case in which the dielectric film has a two-layered structure composed of a silicon oxide film and a silicon nitride film, but also, depending on the circumstance, a case in which the dielectric film has a three-layered structure composed of, for example, a silicon oxide film, a silicon nitride film, and a silicon oxide film, or a case in which the dielectric film has a laminated structure composed of more than three layers.

In another aspect of the electro-optical device of the present invention, an interlayer insulating film, disposed as a base for each pixel electrode, is further provided as a part of the laminated structure, and one surface of the interlayer insulating film is subjected to planarization processing.

According to this aspect, a possibility of creating disorder in the alignment state of electro-optical material, such as liquid crystal, can be reduced, whereby a high quality picture can be displayed.

An electronic apparatus of an aspect of the present invention includes the above-described electro-optical device of the present invention. However, it includes each aspect of the device.

The electronic apparatus of an aspect of the present invention includes the above-described electro-optical device of the present invention, that is, an electro-optical device in which storage capacitance is increased while maintaining a high aperture ratio. Thus, a bright picture can be displayed, and various electronic apparatuses that can display a high quality picture free from display non-uniformity, flickering, etc., such as projection display devices, liquid crystal television, cellular phones, electronic books, word processors, view-finder or direct-monitor-view videotape recorders, workstations, videophones, POS terminals, and touch panels can be realized.

The above operations and other advantages of the present invention become apparent from exemplary embodiments described below.

DETAILED DESCRIPTION OF PREFERRED EMBODIMENTS

The following describes exemplary embodiments of the present invention with reference to the figures. The following exemplary embodiment is an application of an electro-optical device of the present invention to a liquid crystal device.

Configuration of Pixel Section

At first, the configuration of a pixel section in an electro-optical device according to a first exemplary embodiment of the present invention is described with reference to FIG. 1 to FIG. 4.

Figure 1:
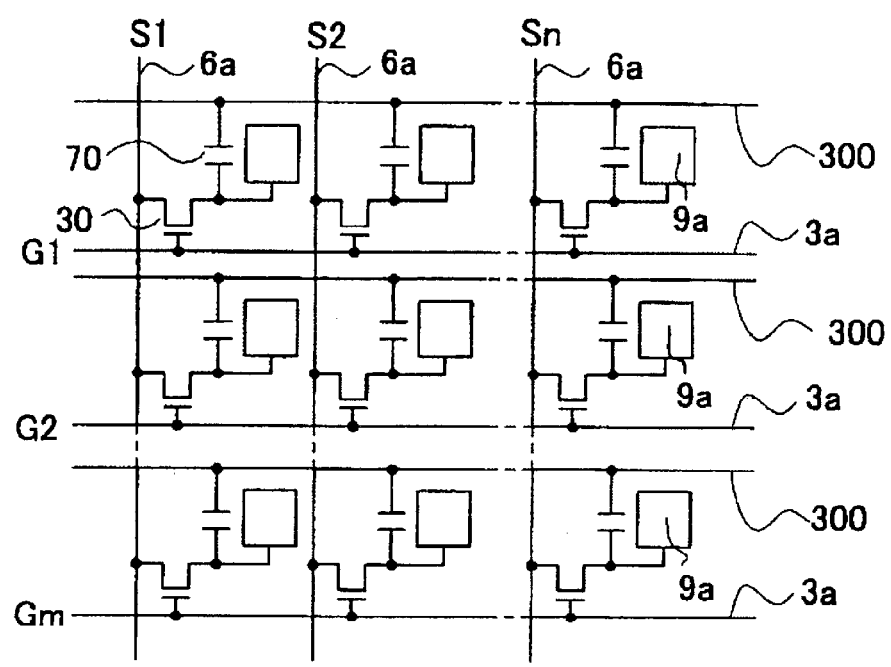
FIG. 1 is a circuit schematic showing equivalent circuits of various elements, wirings, etc., provided in a plurality of pixels in a matrix which constitute a picture display region in an electro-optical device according to an exemplary embodiment of the present invention.
Figure 2:
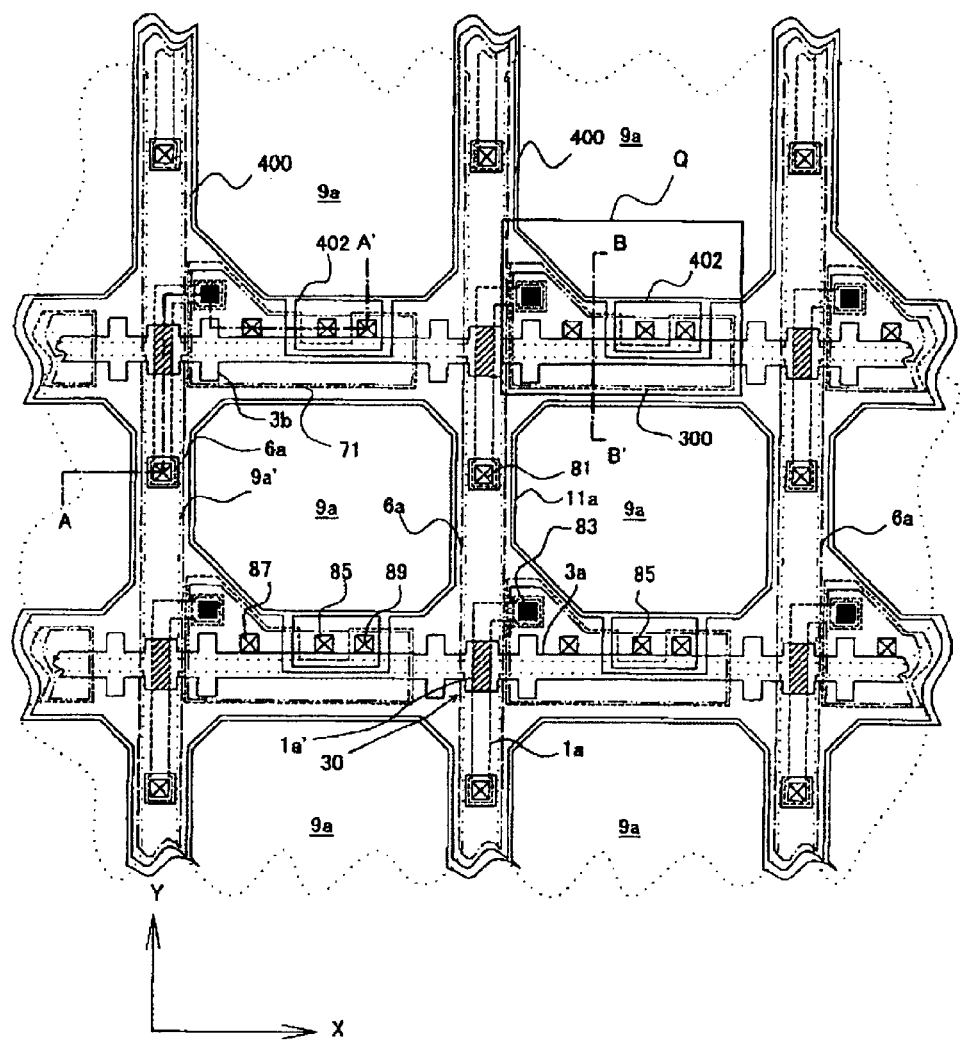
FIG. 2 is a plan view of adjacent pixels on a TFT array substrate of an electro-optical device according to an exemplary embodiment of the present invention on which data lines, scanning lines, pixel electrodes, etc., are formed.
Figure 3:
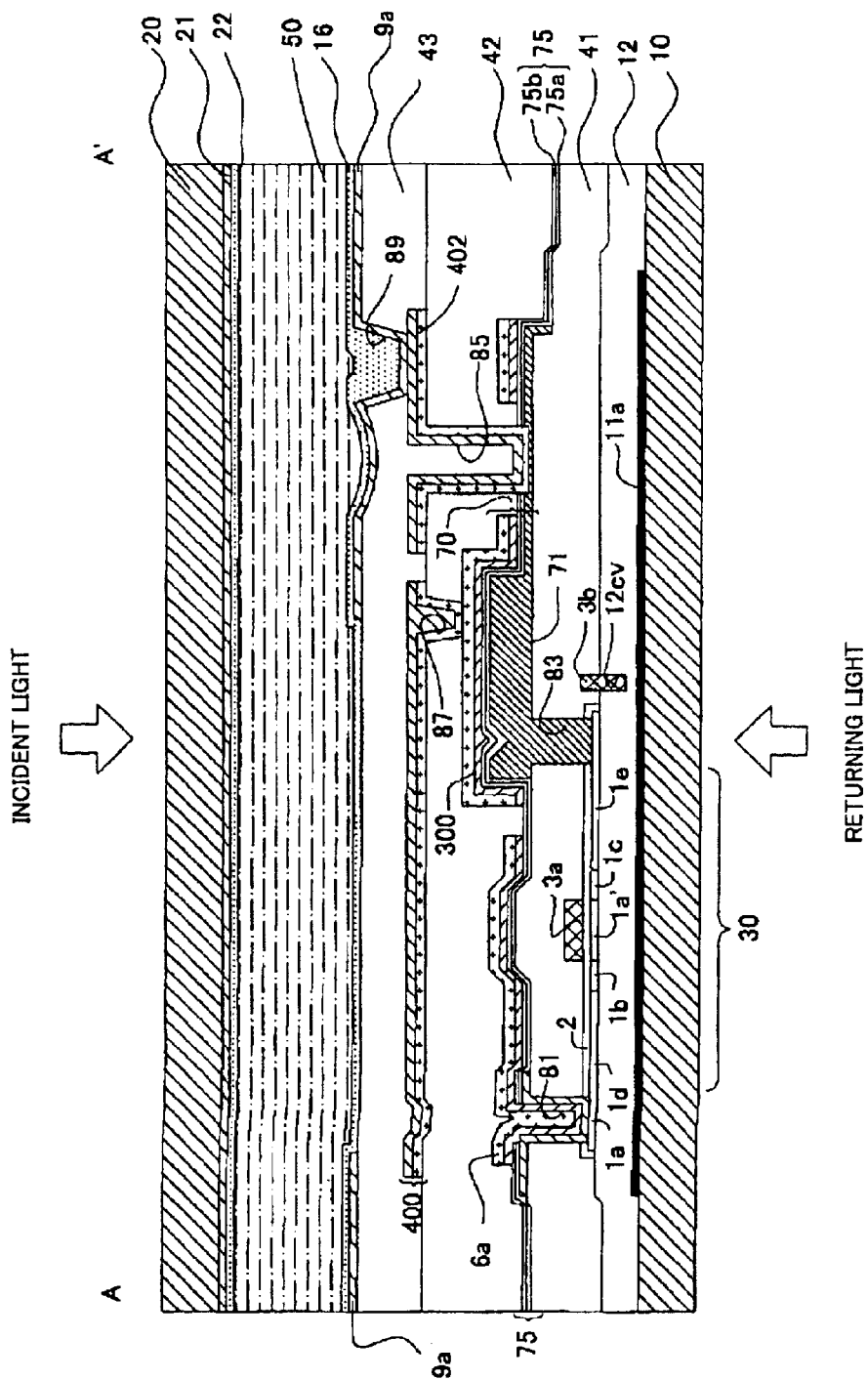
FIG. 3 is a sectional view taken along plane A–A' of FIG. 2.
Figure 4:
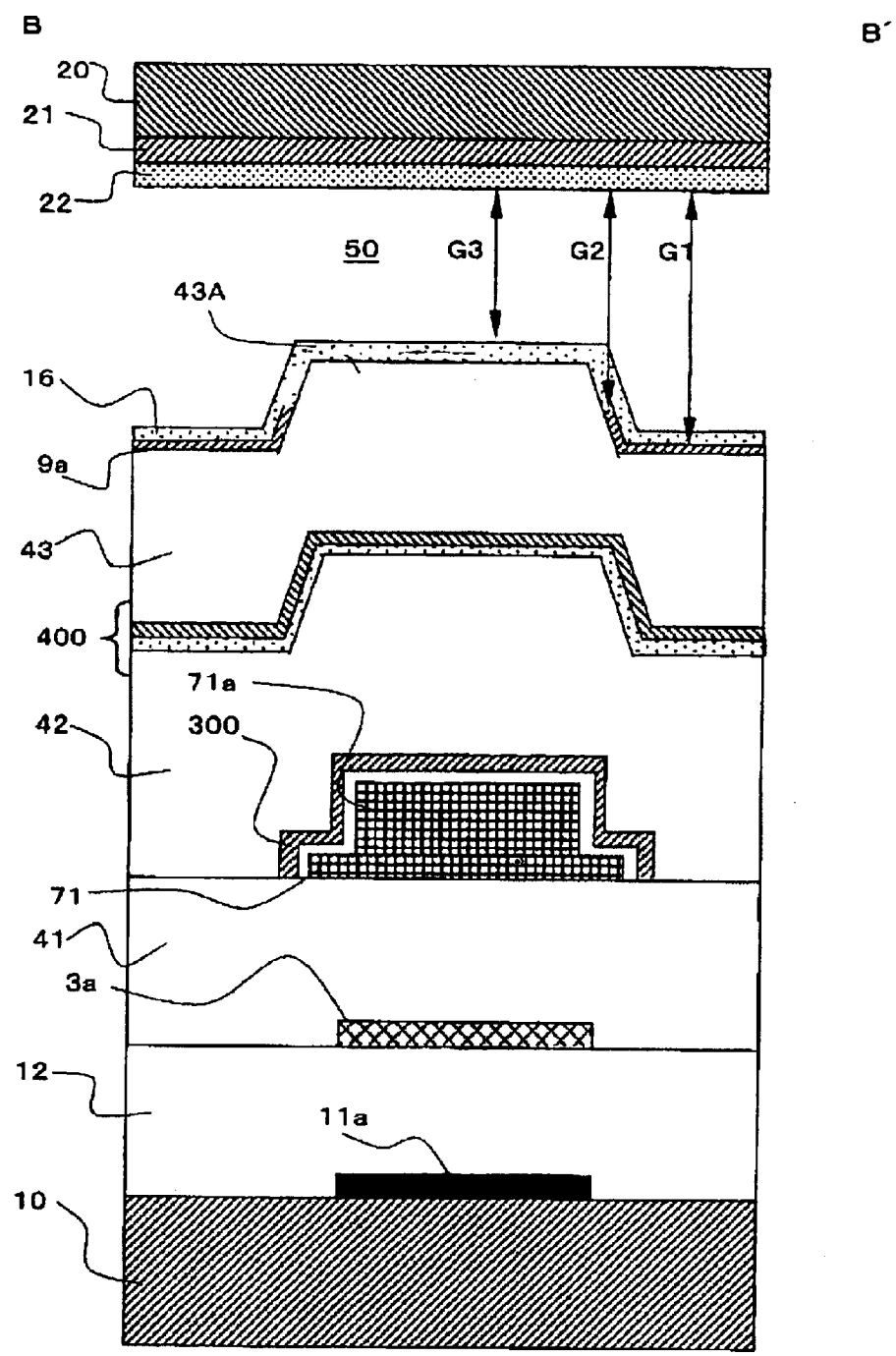
FIG. 4 is a sectional view taken along plane B–B' of FIG. 2.

FIG. 1 shows an equivalent circuit of various elements, wirings, etc., in a plurality of pixels formed in a matrix which constitute a picture display region of the electro-optical device. FIG. 2 is a plan view of a plurality of adjacent pixels on a TFT array substrate on which data lines, scanning lines, and pixel electrodes, etc., are formed. FIG. 3 is a sectional view taken along plane A–A' of FIG. 2, and FIG. 4 is a sectional view taken along plane B–B' of FIG. 2. In FIG. 3 and FIG. 4, in order that layers and members may have such sizes so as to be recognized on the figures, scales for the layers and members are set to differ.

In FIG. 1, in the respective pixels formed in the matrix which constitute the picture display region of the electro-optical device according to this exemplary embodiment, pixel electrodes 9a and TFTs 30 to control switching of the pixel electrodes 9a are formed, and data lines 6a supplied with picture signals are electrically connected to the sources of the TFTs 30. Picture signals S1, S2, . . . , Sn, to be written in the data lines 6a, may be supplied in this order given in a line-at-a-point manner, or may be supplied to each group including a plurality of data lines 6a, which are adjacent to each other.

Also, scanning liens 3a are electrically connected to the gates of the TFTs 30, and scanning signals, G1, G2, . . . , Gm are sequentially applied in pulse form to the scanning lines 3a in the order given in a line-at-a-point manner with predetermined timing. Pixel electrodes 9a are electrically connected to the drains of the TFTs 30, and the switches of the TFTs 30 as switched elements are closed within a predetermined period, whereby the picture signals S1, S2, . . . , Sn, which are supplied from the data lines 6a, are written with predetermined timing.

The picture signals S1, S2, . . . , Sn, which are written in liquid crystal as an example of electro-optical material through the pixel electrodes 9a, and which have predetermined level, are held in a gap with a common electrode formed on an opposing substrate. The alignment and order of molecular association are changed by the level of an applied voltage, whereby the liquid crystal modulates light to enable gray-scale display. In a normally white mode, a transmission factor to incident light decreases in accordance with a voltage applied in units of each pixel, while, in a normally black mode, the transmission factor to incident light increases in accordance with a voltage applied in units of each pixel, so that light having a contrast in accordance with an picture signal is emitted as a whole from the electro-optical device.

Here, to reduce or prevent the held picture signals from leaking, storage capacitors 70 are added in parallel to liquid crystal capacitors formed between the pixel electrodes 9a and the common electrode. The storage capacitors 70 are provided in parallel to the scanning lines 3a, and include fixed potential capacitor electrodes and capacitor electrodes 300 having a potential fixed to a constant.

In the following, an actual configuration of an electro-optical device in which the above circuit operations are realized by the data lines 6a, the scanning lines 3a, the TFTs 30, etc., is described with reference to FIGS. 2 and 3.

At first, in FIG. 2, the plurality of pixel electrodes 9a are provided (their outlines are indicated by the dotted line portions 9a') on the TFT array substrate 10 in a matrix, and the data lines 6a and the scanning lines 3a are provided along vertical and horizontal boundaries of the pixel electrodes 9a. The data lines 6a are formed of, for example, a metal film, an alloy film, or the like, which includes aluminum film or the like, and the scanning lines 3a are formed of, for example, a conductive polysilicon film or the like. Also, the scanning lines 3a are provided so as to oppose channel regions 1a' indicated by the upward-sloping slant-line regions in a semiconductor layer 1a, and the scanning lines 3a function as gate electrodes. In other words, in positions in which the scanning lines 3a cross the data lines 6a, the TFTs 30 for pixel switching, in which main portions of the scanning lines 3a are disposed as gate electrodes in the channel regions 1a' in an opposing manner are formed.

Next, as shown in FIG. 3 which is a sectional view taken along the plane A–A' in FIG. 2, the electro-optical device includes the TFT array substrate 10, which is formed of, for example, a quartz substrate, a glass substrate, or a silicon substrate, and an opposing substrate 20 formed of, for example, a glass substrate or a quartz substrate, which is disposed to oppose to the TFT array substrate 10.

As shown in FIG. 3, on the side of the TFT array substrate 10 is provided the pixel electrode 9a, and an alignment film 16 processed by predetermined alignment, such as rubbing is formed thereon. The pixel electrode 9a is formed of, for example, a transparent conductive film, such as an ITO film. Also, on the side of the opposing substrate 20, the common electrode 21 is provided over the entire surface thereof. On its underside, an alignment film 22 processed by alignment, such as rubbing is provided. Among these, the common electrode 21 is formed of, for example, a transparent conductive film such, as an ITO film, similarly to the pixel electrode 9a, and the alignment films 16 and 22 are formed of transparent organic films, such as polyimide films. Between the TFT array substrate 10 and the opposing substrate 20, which are disposed to oppose each other, electro-optical material, such as liquid crystal, is encapsulated in a space surrounded by sealing material (see FIGS. 15 and 16), which is described later, thus forming a liquid crystal layer 50. The alignment films 16 and 22 cause the liquid crystal layer 50 to be in a predetermined aligned state, with no electric field from the pixel electrode 9a applied. The liquid crystal layer 50 is formed of electro-optical material that is a type of nematic liquid crystal or is a mixture of, for example, several types of nematic liquid crystal. The sealing material is an adhesive which is, for example, photo-curable resin or thermosetting resin, and which is for fixing the TFT array substrate 10 and the opposing substrate 20 in their peripheries, and includes a spacer, such as glass fiber or glass beads, for setting the distance between both substrates to be a predetermined value.

In addition, the TFT array substrate 10 has a laminated structure thereon which includes, in addition to the pixel electrode 9a and the alignment layer 16, various components including the electrode and layer. The laminated structure consists of, as shown in FIG. 3, a first layer including a lower light-shielding film 11a, a second layer including the TFT 30 and the scanning line 3a, a third layer including the storage capacitor 70 and the data line 6a, a fourth layer including the shield layer 400, and a fifth layer (top layer) including the pixel electrode 9a and the alignment film 16 in this order from the bottom. Also, an underlying insulating film 12 between the first and second layers, a first interlayer insulating film 41 between the second and third layers, a second interlayer insulating film 42 between the third and fourth layers, and a third interlayer insulating film 43 between the fourth and fifth layers are provided to reduce or prevent short-circuiting between two components. The above insulating films 12, 41, 42, and 43 of various types include, for example, contact holes or the like to electrically connect a heavily doped source region 1d in the semiconductor layer 1a of the TFT 30 and the data line 6a. In the following, the components are described from the bottom.

At first, the first layer is provided with the lower light-shielding film 11a, which is composed of, for example, one such as a metal element, an alloy, a metal silicide, polysilicide, or a lamination of these, which includes at least one of high melting point metals such as Ti (titanium), Cr (chromium), W (tungsten), Ta (tantalum), and Mo (molybdenum). The lower light-shielding film 11a is patterned in a lattice form in a plan view and defines the aperture region of each pixel (see FIG. 2). In an area of the lower light-shielding film 1a in which the scanning line 3a crosses the data line 6a, a projecting region is formed so that each corner of the pixel electrode 9a is rounded. In addition, the lower light-shielding film 11a may be connected to a constant potential supply in a form extending from the picture display region to its periphery in order to prevent a potential change of the lower light-shielding film 11a from adversely affecting the TFT 30.

Next, the TFT 30 and the scanning line 3a are provided as the second layer. The TFT 30 has an LDD (Lightly Doped Drain) structure, and includes, as its components, the scanning line 3a which functions as the gate electrode, as described above, the channel region 1a of the semiconductor layer 1a, which is formed of, for example, a polysilicon film, and in which an electric field from the scanning line 3a forms a channel, the insulating film 2, which includes a gate insulating film to establish insulation between the scanning line 3a and the semiconductor layer 1a, and a lightly doped source region 1b, a lightly doped drain region 1c, a heavily doped source region 1d, and a heavily doped drain region 1e which are in the semiconductor layer 1a.

Although the TFT 30 preferably has the LDD structure, as shown in FIG. 3, it may have an offset structure in which the lightly doped source region 1b and the lightly doped drain region 1c are not doped with impurities, or may be a self-aligned TFT having a heavily doped source region and a heavily doped drain region, which are formed in a self-aligned manner such that a gate electrode formed by a portion of the scanning line 3a is used as a mask to perform doping with impurities at a high concentration. Also, although this exemplary embodiment employs a single gate structure in which only one gate electrode for the TFT 30 for pixel switching is disposed between the heavily doped source region 1d and the heavily doped drain region 1e, two or more gate electrodes may be disposed between both regions. As described above, by using a dual gate or at least a triple gate to form a TFT, a leak current in a junction between a channel and each of source and drain regions can be reduced or prevented, thus reducing a current in an OFF state. Also, the semiconductor layer 1a in the TFT 30 can be either a non-monocrystal layer or a monocrystal layer. A known method, such as bonding may be used for forming the monocrystal layer. By forming the semiconductor layer 1a as a monocrystal layer, enhancement in the performance of a peripheral circuit can be particularly achieved.

On the above-described lower light-shielding film 11a and below the TFT 30, the underlying insulating film 12, which is formed of, a silicon oxide film or the like, is provided. The underlying insulating film 12 has, in addition to a function of establishing interlayer insulation of the TFT 30 from the lower light-shielding film 11a, a function in which formation on the entire surface of the TFT array substrate 10 reduces or prevents roughness in surface polishing on the TFT array substrate 10, and a change in characteristics of the TFT 30 for pixel switching which is caused by dirt remaining after cleaning.

In this exemplary embodiment, in particular, on the underlying insulating film 12, at each side of the semiconductor layer 1a in a plane view, a groove (groove formed in the form of a contact hole) 12cv is formed which has a width equal to or longer than the channel length of the semiconductor layer 1a extending along the data line 6a, which is described later. The scanning line 3a, which is stacked on the groove 12cv correspondingly thereto, includes a downward depression (not shown in FIG. 2). Also, the scanning line 3a is formed so as to accommodate the entire groove 12cv, whereby horizontal projections 3b formed integrally with the scanning line 3a are provided to extend therefrom. Accordingly, as fully shown in FIG. 2, the semiconductor layer 1a of the TFT 30 is covered from sides in a plan view, and incidence of light at least from this portion is suppressed. One horizontal projection 3b may be provided at one side of the semiconductor layer 1a.

In addition to the second layer, the third layer includes the storage capacitor 70 and the data line 6a. The storage capacitor 70 is formed such that a first relay layer 71 electrically connected as a pixel-potential capacitor electrode to the heavily doped drain region 1e and the pixel electrode 9a in the TFT 30, and a capacitor electrode 300 as a fixed potential capacitor electrode are disposed opposing each other, with a dielectric film 75 provided therebetween. A capacitor electrode 700 is electrically connected to a shield layer 400 by a contact hole 87. The storage capacitor 70 enables a remarkable increase in potential holding characteristics in the pixel electrode 9a. In this exemplary embodiment, in particular, the storage capacitor 70 is formed as one having a three-dimensional shape as shown in FIG. 3 or FIG. 4 which is a sectional view taken along plane B–B' of FIG. 2. In FIG. 4, for simplification, the capacitor electrode 300 is not depicted as one having a two-layered structure. This applies to the subsequent FIG. 5.

As shown in FIG. 4, the dielectric film 75 is formed of, for example, a relatively thin HTO (High Temperature Oxide) film having a film thickness of approximately 5 to 200 nm, a silicon oxide film, such as a LTO (Low Temperature Oxide) film, a silicon nitride film, or the like. In this exemplary embodiment, as shown in FIG. 3, in particular, the dielectric film 75 has a two-layered structure composed of a silicon oxide film 75a at a lower level and a silicon nitride film 75b at an upper level, and is formed over the entire surface of the TFT array substrate 10. Also, as another example of the dielectric film 75, by forming the lower silicon oxide layer 75a over the entire surface of the TFT array substrate 10, and patterning the upper silicon nitride film 75b so as to fall within a light-shielding region (non-aperture region), a transmission factor may be reduced or prevented from decreasing due to the presence of the silicon nitride film, which has coloring properties.

This expects a further enhancement in electric charge storing characteristics, and thus a further enhancement in potential holding characteristics in the pixel electrode 9a. This point will be later mentioned again with reference to FIG. 5 and thereafter. Here, in particular, only the capacitor electrode 300, which forms the storage capacitor 70 is noted and the data line 6a, which is formed as the same film that forms the capacitor electrode 300, is described.

At first, the formation as "the same film" of the capacitor electrode 300 and the data line 6a means that both are simultaneously formed as the same layer in a step of a producing phase. However, the capacitor electrode 300 and the data lines 6a are not continuously formed in a planar form but are separated from each other in patterning.

Specifically, as shown in FIG. 2, the capacitor electrode 300 is formed so as to overlap with an area in which the scanning line 3a is formed, that is, so as to be separated along the X-direction in FIG. 2. The data line 6a is formed so as to agree with the longitudinal direction of the semiconductor layer 1a, that is, so as to extend in the Y-direction in FIG. 2. More specifically, the capacitor electrode 300 includes a main portion extending along the scanning line 3a, a projection (portion looking a trapezoidal shape) that projects upwardly along the semiconductor layer 1a in an area adjacent to the semiconductor layer 1a in FIG. 2, and a pit which is a slightly scooped portion corresponding to a contact hole 85, which is described later. The projection contributes to enlargement of the area in which the storage capacitor 70 is formed. In other words, the storage capacitor 70 is formed in a plan view in an area overlapping with the scanning line 3a between adjacent data lines 6a, and in an area in which each corner of the pixel electrode 9a is rounded by the lower light shielding film 11 in a corner in which the scanning line 3a crosses the excitation lines 6a.

In addition, the data lines 6a include a main portion linearly extending along the Y-direction in FIG. 2. An upper end of the semiconductor layer 1a in FIG. 2 has a shape folding at 90 degrees to the right. This is because electric connection between the semiconductor layer 1a and the storage capacitor 70 is established, with the data line 6a avoided (see FIG. 3).

In this exemplary embodiment, by performing patterning or the like so that the shapes are formed, the capacitor electrode 300 and the data line 6a are simultaneously formed.

Also, as shown in FIG. 3, the capacitor electrode 300 and the data line 6a are each formed as a film having a two-layered structure composed of a lower layer formed of conductive polysilicon and an upper layer formed of aluminum. Among them, the data line 6a is connected to the semiconductor layer 1a in the TFT 30 by a contact hole 81 passing through an opening in a dielectric film 75, which is described later. The data line 6a has the above two-layered structure, and the first relay layer 71 is formed of a conductive polysilicon film, whereby electric connection between the data line 6a and the semiconductor layer 1a is directly realized by conductive polysilicon films. In other words, the films consist of the polysilicon film of the first relay layer, and the lower polysilicon film and upper aluminum layer of the data line 6a in this order from the bottom. Accordingly, good electric connection between both can be maintained.

Also, the capacitor electrode 300 and the data line 6a include aluminum having relatively large light reflection characteristics and includes polysilicon having light absorption characteristics, thereby functioning as light shielding layers. In other words, according to these, travel of the incident light (see FIG. 3) on the semiconductor layer 1a in the TFT 30 can be blocked in its upper side.

Above the TFT 30 and scanning line 3a described above, and below the storage capacitor 70 and data line 6a, the first interlayer insulating film 41 is formed, which consists of, for example, a film of silicate glass such as NSG (nonsilicate glass), PSG (phosphorus silicate glass), BSG (boron silicate glass), BPSG (boron phosphorus silicate glass), a silicon nitride film, a silicon film, or the like, or preferably an NSG. Below the first interlayer insulating film 41, the contact hole 81 is made, which electrically connects the heavily doped source region 1d in the TFT 30 and the data line 6a. In the first interlayer insulating film 41, a contact hole 83 which electrically connects the heavily doped drain region 1e in the TFT 30 and the first relay layer 71 constituting the storage capacitor 70 is made.

Between the two contact holes, a portion in which the contact hole 81 is formed is such that a dielectric film 75, which is described later, is not formed, in other words, an opening portion is formed in the dielectric film 75. This is because it is required in the contact hole 81 that electric conduction between the heavily doped source region 1b and the data line 6a be established by the first relay layer 71. In this connection, an operation and advantage can be also obtained in that, by providing the dielectric film 75 with the above opening portion, when hydrogenation processing on the semiconductor layer 1a in the TFT 30 is performed, hydrogen for use in the processing can be led to easily reach even the semiconductor layer 1a through the opening portion.

In addition, in this exemplary embodiment, by burning the first interlayer insulating film 41 at approximately 1000° C., ions implanted into the polysilicon films constituting the semiconductor layer 1a and the scanning line 3a may be activated.

Next to the above-described third layer, in the fourth layer, a lightproof shield layer 400 is formed. The shield layer 400 is formed in a lattice form so as to extend in the X-direction and Y-direction in FIG. 2 in a plan view, as shown in FIGS. 2 and 3. In the shield layer 400, each portion which extends in the Y-direction in FIG. 2 is formed broader than the data line 6a so as to cover the data line 6a. Also, each portion which extends in the X-direction in FIG. 2 includes a cutout around the center of one side of each pixel electrode 9a so that an area for forming a third relay electrode 402, which is described later, is reserved. In addition, in each corner in which the shield layers 400 extend in the X-direction and Y-direction in FIG. 2, an almost triangular portion is provided correspondingly to the almost trapezoidal projection of the above-described capacitor electrode 300. The almost triangular portion is also included in the shield layer 400.

The shield layer 400 is provided extending from a picture display region 10a in which the pixel electrode 9a is disposed, to the periphery thereof, and electrically connected to a constant potential supply, thereby having a fixed potential. The "constant potential supply" mentioned here may be a constant potential supply for a positive power supply or a negative power supply to a data-line driving circuit 101, and may be a constant potential supply for supply to the common electrode 21 on the opposing substrate 20.

According to the presence of the shield layer 400, which is formed so as to cover the entirety of the data line 6a (see FIG. 3) and which has a fixed potential, the influence of capacitive coupling between the data line 6a and the pixel electrode 9a can be reduced or eliminated. In other words, a situation in which the potential of the pixel electrode 9a is changed in accordance with power supply to the data line 6a can be avoided, thus reducing a possibility that display non-uniformity or the like along the data line 6a occurs in a picture. Since, in this exemplary embodiment, the shield layer 400 is formed in a lattice form, unnecessary coupling can be suppressed so that it is not generated also in a portion where the scanning line 3a extends. In addition, the above triangular portion of the shield layer 400 can reduced or eliminate the influence of capacitive coupling between the capacitor electrode 300 and the pixel electrode 9a. Also, thereby, an operation and advantage almost identical to the above ones can be obtained.

In the fourth layer, the second relay layer 402, which is an example of a "relay layer" in the present invention, is formed as the same film as the shield layer 400. The second relay layer 402 has a function of relaying electric connection between the first relay layer 71 constituting the storage capacitor 70 and the pixel electrode 9a by using a contact hole 89, which is described later. The shield layer 400 and the second relay layer 402 are not continuously formed similarly to the capacitor electrode 300 and the data line 6a, but are formed so as to be separate in patterning.

Also, the above shield layer 400 and second relay layer 402 each have a two-layered structure composed a lower aluminum layer and an upper titanium nitride layer. Accordingly, it is expected that the two-layered structure functions as barrier metal for to reduce or prevent, by the titanium nitride, penetration of the contact hole 89 when it is made. Also, in the second relay layer 402, the lower aluminum layer is connected to the first relay layer 71 constituting the storage capacitor 70, and the upper titanium nitride layer is connected to the pixel electrode 9a, which consists of ITO, etc. In this case, in particular, the latter connection is good. In this respect, the above is a contrast to the case where, if a form is employed in which the aluminum and the ITO are directly connected to each other, galvanic corrosion occurs between both, so that good electric connection is not realized due to disconnection of the aluminum, or insulation caused by formation of alumina, etc. As described above, in this exemplary embodiment, good electric connection between the second relay layer 402 and the pixel electrode 9a is realized, whereby the application of a voltage to the pixel electrode 9a or charge holding characteristics in the pixel electrode 9a can be preferably maintained.

The shield layer 400 and the second relay layer 402 include aluminum having relatively good light-reflecting performance, and titanium nitride having good light-absorbing performance, thereby functioning as light shielding layers. In other words, according to these, the traveling of the incident light (see FIG. 2) on the semiconductor layer 1a in the TFT 30 can be shielded in the upper side thereof. These things apply to the above capacitor electrode 300 and the data line 6a, as already described. In this exemplary embodiment, the shield layer 400, the second relay layer 402, the capacitor electrode 300, and the data line 6a constitute part of the laminated structure built on the TFT array substrate 10, and can function as an upper light shielding film (or a "built-in light shielding film" when a point of constituting "part of the laminated structure" is noted) to shield light incidence from above on the TFT 30. According to the concept of the "upper light shielding film" or the "built-in light shielding film", it is possible that, not only the above configuration, but also the scanning line 3a and the first relay layer 71, be included in it. In brief, under assumption of broadest interpretation, any component formed of opaque material built on the TFT array substrate 10 can be called the "upper light shielding film" or "built-in light shielding film".

On the above-described data line 6a and below the shield layer 400, the second interlayer insulating film 42 is formed, which is formed of a film of silicate glass, such as NSG, PSG, BSG, or BPSG, a silicon nitride film, silicon oxide film, or the like, or preferably NSG. In the second interlayer insulating film 42, the contact hole 87 to electrically connect the shield layer 400 and the capacitor electrode 300, and the contact hole 85 to electrically connect the second relay layer 402 and the first relay layer 71 are formed.

For the second interlayer insulating film 42, burning as described above for the first interlayer insulating film 41 is not performed, whereby relaxation of stress in the vicinity of the interface of the capacitor electrode 300 may be achieved.

Finally, in the fifth layer, the pixel electrodes 9a are formed in a matrix, as described above, and an alignment film 16 is formed on each pixel electrode 9a. Below the pixel electrode 9a, the third interlayer insulating film 43 is formed, which is formed of a silicate glass film, such as NSG, PSG, BSG, or BPSG, a silicon nitride film, a silicon oxide film, or the like, or preferably BPSG. In the third interlayer insulating film 43, the contact hole 89 to electrically connect the pixel electrode 9a and the second relay layer 402 is formed.

Configuration of Storage Capacitor

Figure 5:
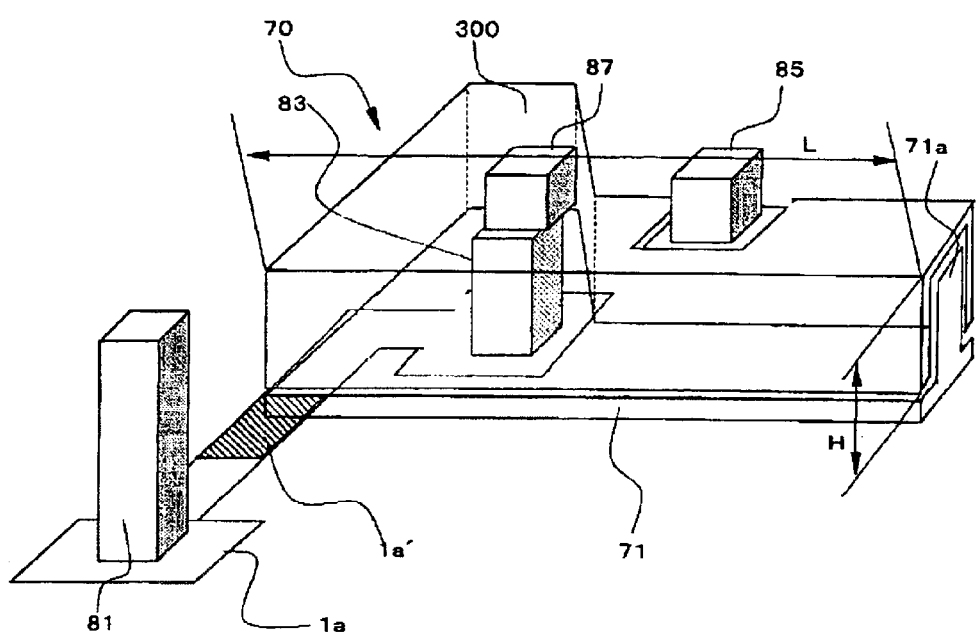
FIG. 5 is a perspective view showing the three-dimensional configuration of a storage capacitor corresponding to one pixel.

In the following, the configuration of the storage capacitor 70, more specifically, the three-dimensional configuration of the storage capacitor 70, is described with reference to FIGS. 4 and 5. Here, FIG. 5 is a perspective view showing the three-dimensional configuration of the storage capacitor 70 in the portion denoted by reference mark Q in FIG. 2. FIG. 5 does not show all the components shown in FIGS. 2 to 4. However, illustration of some elements, for example, the dielectric film 75 constituting the storage capacitor 70, the scanning line 3a, etc., is omitted, as required.

In FIGS. 4 and 5, the storage capacitor 70 has a three-dimensional portion formed along a direction in which the scanning line 3a extends. In this three-dimensional portion, a projecting portion 71a is formed as part of the first relay layer 71, and the dielectric film 75 and the capacitor electrode 300 are formed on the projecting portion 71a, whereby a capacitor is formed. Accordingly, the storage capacitor 70 has a structure including a portion in which the first relay layer 71, the dielectric film 75, and the capacitor electrode 300 constitute a laminated structure along a plane orthogonal to the surface of the substrate.

Here, it is preferable that the height of such a projecting shape, or the height H (see FIG. 5) of the projecting portion 71a be approximately 50 to 1000 nm. When the height is equal to or less than this range, an increasing effect of the storage capacitance is not sufficiently obtained, and when the height is equal to or greater than this range, a difference in level is so large that demerits occur, such as inferior alignment in the liquid crystal 50 which is caused by the difference in level.

The storage capacitor 70 is formed so as to include the three-dimensional portion, whereby, as shown in FIG. 4, a projecting portion 43A is formed above the surface of the third interlayer insulating film 43 formed on the three-dimensional portion, with the second interlayer insulating film 42 and the shield layer 400 and the like provided therebetween. In other words, in FIG. 4, between right and left pixel electrodes 9a adjacent to each other, so to speak, a barrier is provided.

As can be found from FIGS. 2 to 5 the storage capacitor 70 in this form is formed so as to be, so to speak, confined in the light shielding region including the areas in which the scanning line 3a and the data line 6a are formed, so that the aperture ratio does not decrease.

Also, the above-described first relay layer 71, capacitor electrode 300, and dielectric film 75 respectively have the following properties in this exemplary embodiment.

At first, the first relay layer 71 is formed of, for example, a conductive polysilicon film, and functions as a pixel-potential capacitor electrode. The first relay layer 71 may be formed of a single layer film or multilayer film including metal or alloy. Also, the first relay layer 71 has, not only the function of the pixel-potential capacitor electrode, but also a function of relaying connection between the pixel electrode 9a and the TFT 30 by using the contact holes 83, 85, and 89. The first relay layer 71 is formed so as to have a shape almost identical to the plane shape of the capacitor electrode 300, as shown in FIG. 2.

Next, the capacitor electrode 300 functions as a fixed potential capacitor electrode for the storage capacitor 70. In order that, in this exemplary embodiment, the capacitor electrode 300 is set to have a fixed potential, the setting is achieved by establishing electric connection to the shield layer 400 which is set to have a fixed potential.

The formation of the capacitor electrode 300 in which the capacitor electrode 300 is formed of the same film as the data line 6a, and has a two-layered structure including a lower polysilicon film and an upper aluminum film, has already been described.

Finally, as shown in FIG. 3, the dielectric film 75 includes a silicon oxide film, such as a relatively thin HTO (High Temperature Oxide) film, a LTO (Low Temperature Oxide) and the like, or a silicon nitride film, which are relatively thin film having a film thickness of, for example, approximately 5 to 200 nm. In a point of increasing the storage capacitor 70, the dielectric film 75 is better as it is thinner as far as the film reliability is sufficiently obtained.

In this exemplary embodiment, in particular, the dielectric layer 75 has a two-layered structure having a lower silicon oxide film 75a and an upper silicon nitride film 75b, as shown in FIG. 3. Accordingly, the presence of the silicon nitride film 75b having a relatively large dielectric constant enables an increase in the capacitance of the storage capacitor 70, and despite that, the presence of the silicon oxide film 75a reduces or prevents the breakdown characteristic of the storage capacitor 70 from decreasing. As described above, by forming the dielectric film 75 in the two-layered structure, two operation and advantages opposite to each other can be enjoyed. Also, the presence of the silicon nitride film 75b reduces or prevents water from entering the TFT 30. Accordingly, in this exemplary embodiment, a situation in which a threshold voltage in the TFT 30 increases does not occurs, thus enabling a relatively long-period operation of the apparatus. In this exemplary embodiment, the dielectric film 75 has a two-layered structure. However, depending on the circumstances, it may has a three-layered structure composed of, for example, a silicon oxide film, a silicon nitride film, and a silicon oxide film, or a laminated structure composed of three or more layers.

Also, in this exemplary embodiment, the data line 6a and the capacitor electrode 300 each have a two-layered structure. However, by using a three-layered structure composed of a polysilicon film, an aluminum film, and a titanium nitride film from the bottom, the titanium nitride film is formed as a barrier metal when the contact hole 87 is made.

In FIGS. 3 to 5, the storage capacitor 70 according to this exemplary embodiment is formed having a laminated structure composed of the first relay layer 71, the dielectric film 75, and the capacitor electrode 300 in the order from the bottom on the TFT array substrate 10. Depending on the circumstances, in reverse, a laminated structure composed of the capacitor electrode 300, the dielectric film 75, and the first relay layer 71 may be employed.

In brief, a pair of electrodes may be provided with the dielectric film 75 provided therebetween, and as far as such a relative relationship is satisfied, employment of any specific configuration is basically free.

In the electro-optical device according to this exemplary embodiment which has the above-described configuration, the presence of the storage capacitor 70 causes achievement of the following operation and advantage.

Figure 6:
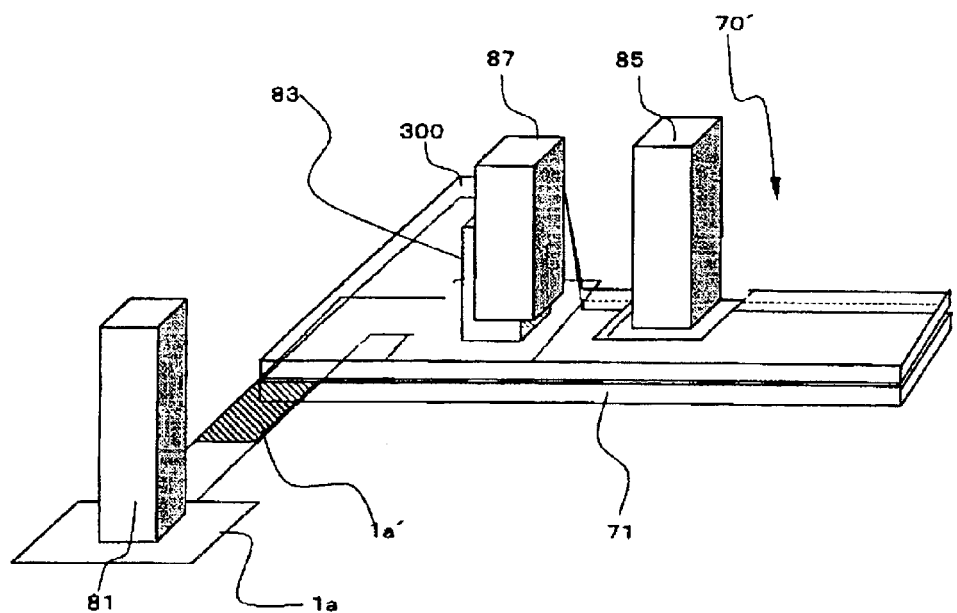
FIG. 6 is a perspective view which is similar in purpose to FIG. 5 and which shows an example of an electro-optical device of the related art in which a storage capacitor includes no three-dimensional portion.

At first, in this exemplary embodiment, the sectional shape of the storage capacitor 70 is formed so as to include a projecting shape, whereby an operation and advantage of an increase in capacitance is expected within the areas of sides of the projecting shape. This becomes apparent from the comparison between FIG. 5, which has already been referred to, and FIG. 6 which shows the configuration of a storage capacitor 70' and which includes no three-dimensional portion although it is identical in purpose to FIG. 5. In FIG. 6, the storage capacitor 70' has lower and upper electrodes constituted by a relay layer 71' and a capacitor electrode 300' which are two-dimensionally formed, whereby the storage capacitor 70' has a configuration in which the three-dimensional portion along the scanning line 3a as shown in FIG. 5 does not exist.

As is apparent from FIGS. 5 and 6, in this exemplary embodiment, a projecting portion 71a of height H is formed as part of the first relay layer 71 by generally the length L of one side of the pixel electrode 9a. Thus, the storage capacitor 70 the area of which is increased by generally 2HL as a whole compared with FIG. 6, is formed in FIG. 5. It is needless to say that the area 2HL definitely corresponds to the area of a side wall of the three-dimensional portion.

Accordingly, according to this exemplary embodiment, the capacitance of the storage capacitor 70 can be increased without two-dimensionally increasing the area of the capacitor electrode 300 as the fixed potential capacitor electrode and the first relay layer 71 as the pixel potential capacitor electrode. Thus, enlargement of the storage capacitor 70 is realized while maintaining a high aperture ratio, whereby a high quality picture free from display non-uniformity, flickering, etc., can be displayed.

Also, in this exemplary embodiment, as described above, in order for the sectional shape of the storage capacitor 70 to include a projecting shape, in the first relay layer 71, part thereof or the projecting portion 71a is formed, whereby its production is facilitated. In other words, the projecting portion 71a or the projecting shape can be formed in the process of forming the first relay layer 71. Thus, for example, when considering the points of separately providing material for the projecting shape, implementing a separate process, etc., the production cost can be correspondingly reduced.

Moreover, in this exemplary embodiment, the part of the storage capacitor 70 which includes the projecting shape is formed along the scanning line 3a, whereby the following operation and advantage can be obtained. In other words, when the electro-optical device according to this exemplary embodiment is driven by a 1H inversion driving method, a lateral electric field, generated between two pixel electrodes which are adjacent to each other with the scanning line 3a provided therebetween, can be suppressed. This is because of that, as shown in FIG. 4, a projecting portion 43A is formed above the surface of the third interlayer insulating film 43 formed on the projecting portion 71a as part of the first relay layer 71, with the second interlayer insulating film 42 and the shield layer 400 provided therebetween. In other words, at first, by forming the pixel electrode 9a so that edges of the pixel electrode 9a are positioned on the projecting portion 43A, the distance between the common electrode 21 and the pixel electrode 9a can be narrowed from G1 to G2, or can be narrower than G1, as FIG. 4 shows, whereby a lateral electric field, or an electric field vertically applied in FIG. 4 can be enhanced.

Secondly, one cause is that the lateral electric field itself can be weakened by any dielectric constant of the projecting portion 43A regardless of whether the edges of the pixel electrode 9a are present on the projecting portion 43A or not. Thirdly, one cause is that, with narrowing of the gap between the projecting portion 43A and the common electrode 21 from G1 to G3, as shown in FIG. 4, the volume, that is, the volume of the liquid crystal layer 50 positioned in the gap can be reduced, thus relatively reducing the influence of the lateral electric field on the liquid crystal layer 50 is possible.

As described above, according to this exemplary embodiment, the generation of a lateral electric field that may be generated between the data lines 6a can be suppressed, thus reducing a possibility that the aligned state of liquid crystal molecules in the liquid crystal layer 50 may be disarranged by the lateral electric field. This enables a high quality picture to be displayed.

Although, in the above exemplary embodiment, the sectional shape of the three-dimensional portion of the storage capacitor 70 is rectangular, the present invention is not limited to such a form. For example, as FIG. 7 shows, a form in which the sectional shape is a tapered shape may be used.

Figure 7:
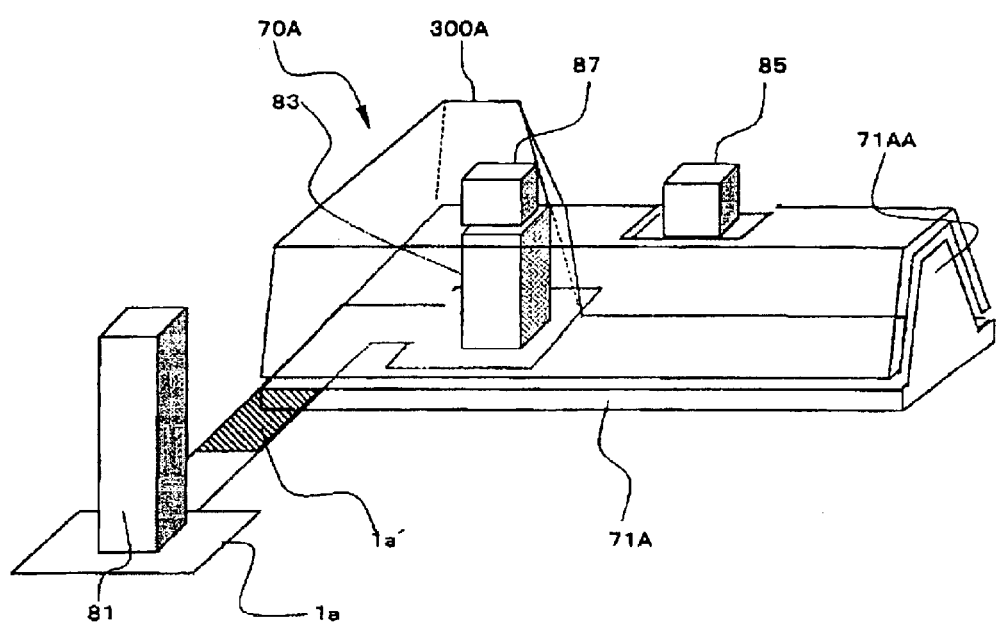
FIG. 7 is a perspective view which is similar in purpose to FIG. 5, and which shows an example in which a projecting shape, included in the sectional shape of the storage capacitor, is a tapered shape.

Here, FIG. 7 is identical in purpose to FIG. 5 and is a perspective view of a storage capacitor 70A whose sectional shape is a tapered shape.

In FIG. 7, a projecting portion 71AA integrated with a first relay layer 71A has a tapered shape as a sectional shape, and a dielectric film and a capacitor electrode 300A are formed on the projecting portion 71AA, whereby the storage capacitor 70A has a form in which its sectional shape includes a tapered shape.

Also, in this case, it is apparently similar to that in FIG. 5 that, although an increase in storage capacitance is expected by the area of a side wall constituting a three-dimensional portion, the aperture ratio is not reduced. In addition, this form has, in particular, as is clear from FIG. 7, no acute corner like the projecting portion 71A shown in FIG. 5, and a rounded corner. Thus, the dielectric film and the capacitor electrode 300A on the projecting portion 71AA can be preferably formed. This is because, in the film forming process of the dielectric film and the capacitor electrode 300A, concern about deterioration in coverage, etc., is not necessary, compared with the form in FIG. 4 or FIG. 5.

Also, in the above exemplary embodiment, the projecting portion 71A is formed to be integrated with the first relay layer 71. However, the present invention is not limited to such a form. For example, a form in which, by providing a projecting member made of material different from that for the first relay layer 71 below the first relay layer 71, the dielectric film 75 and the capacitor electrode 300 are formed on the member, may be employed.

In addition, although the foregoing describes a form in which a projecting portion is formed along the scanning line 3a, the present invention is not limited to such a form. For example, the surface of the third interlayer insulating film 43 can be planarized by a CMP (Chemical Mechanical Polishing) process or the like. This enables a reduction in alignment defects of the liquid crystal layer 50 which are caused by a difference in level of various wirings and elements, etc., which exist below the film. However, instead of implementing planarization processing on the third interlayer insulating film 43, as described above, by forming a groove in at least one of the TFT array substrate 10, the underlying insulating film 12, the first interlayer insulating film 41 or the second interlayer insulating film 42, and embedding wirings, such as the data line 6a and the TFT 30, etc., the planarization processing may be performed.

Modifications of Electro-Optical Device

Figure 8:
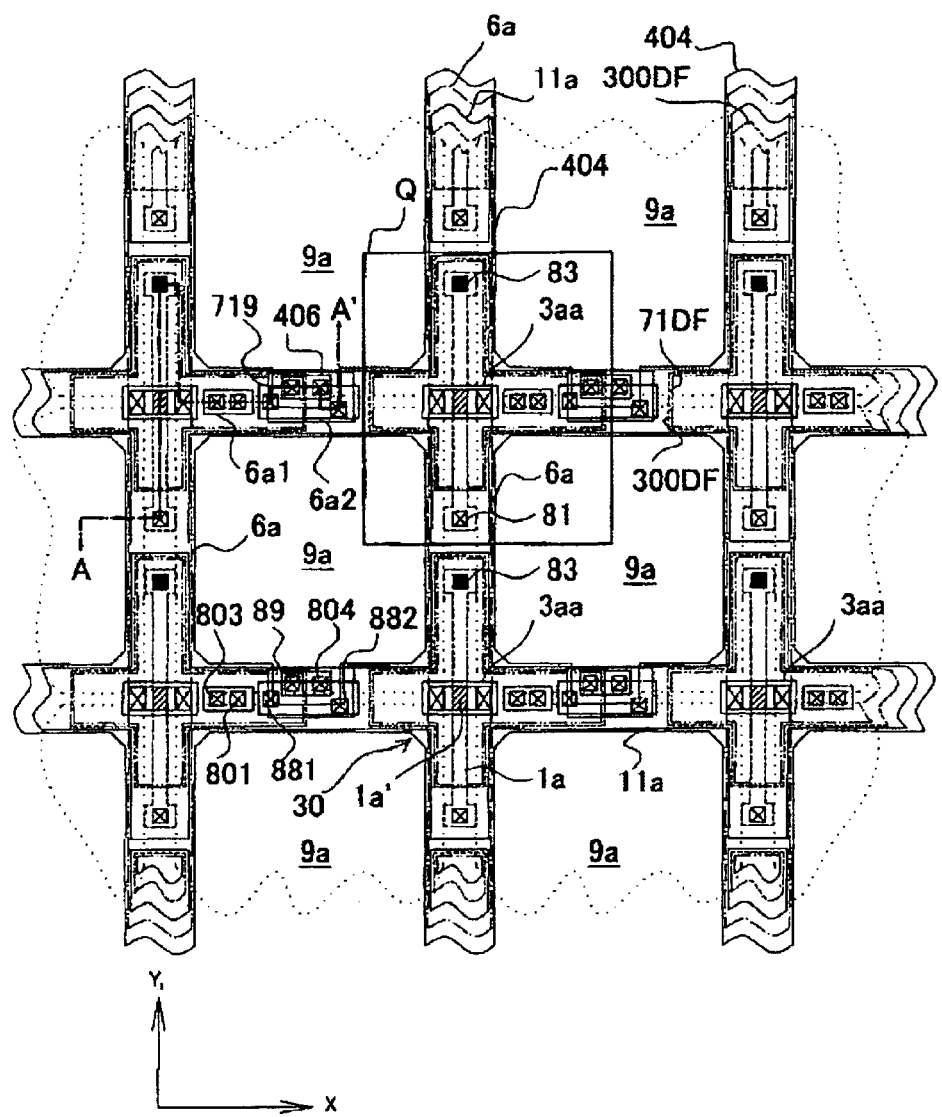
FIG. 8 is an illustration which is similar in purpose to FIG. 2 and which shows an aspect in which storage capacitors and data lines are formed in different layers.
Figure 9:
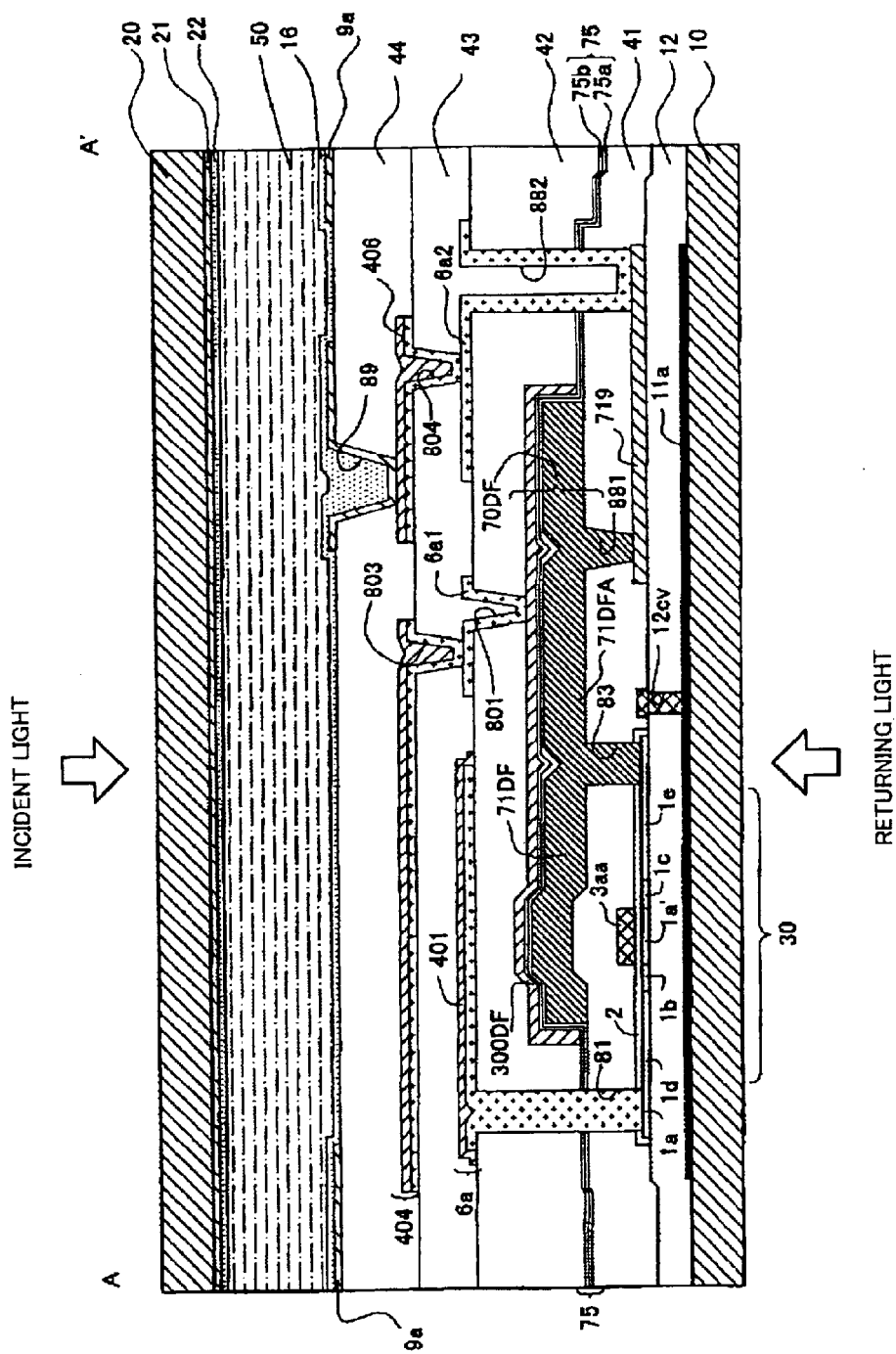
FIG. 9 is an illustration which is similar in purpose to FIG. 4 and which shows an aspect in which storage capacitors and data lines are formed in different layers.
Figure 10:
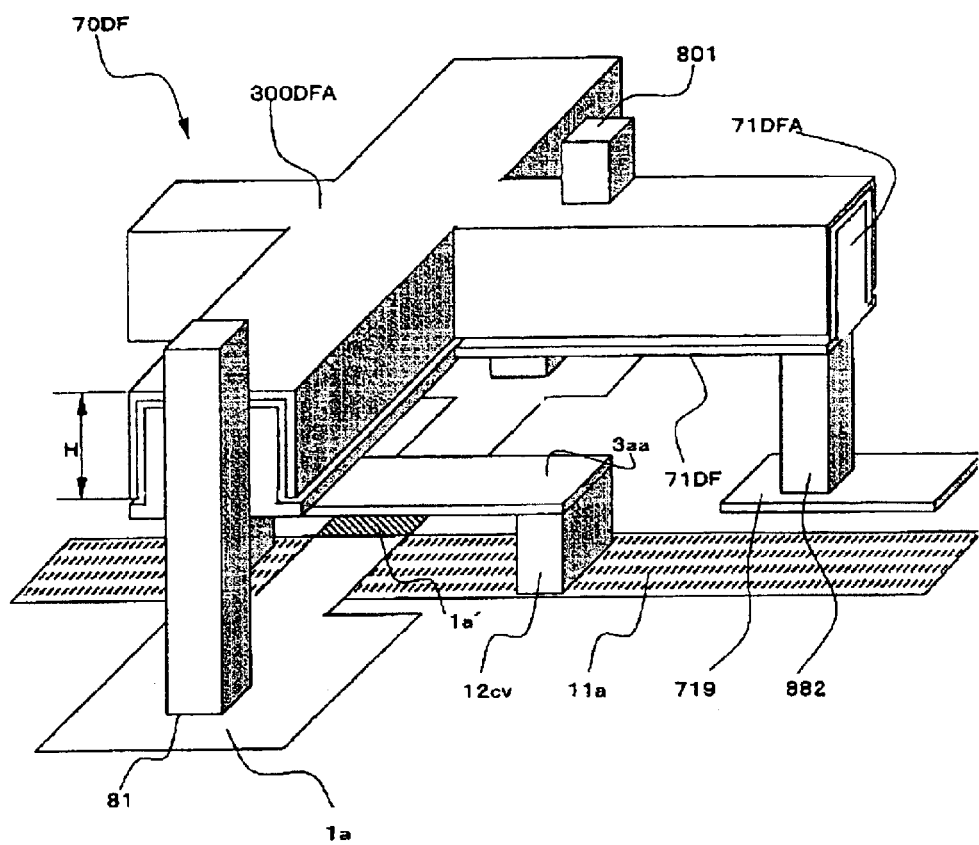
FIG. 10 is a perspective view which is similar in purpose to FIG. 5 and which shows the three-dimensional configuration of a storage capacitor corresponding to one pixel shown in FIG. 8 and FIG. 9.

A modification of the electro-optical device of the present invention is described below with reference to FIGS. 8 to 10. Here, FIGS. 8 and 9 are identical in purpose to FIGS. 2 and 3, and are a plan view and a sectional view which show features of the modification. Also, FIG. 10 is identical in purpose to FIG. 5, and is a perspective view showing the three-dimensional configuration of a storage capacitor 70DF in the portion denoted by reference mark Q in FIG. 8. The electro-optical device in this modification is almost identical to a configuration in the pixel section of the electro-optical device of each of the exemplary embodiments of various types. Accordingly, in the following, only characteristic portions in the modification are mainly described, and a description of the remaining portions is omitted or simplified.

FIGS. 8 and 9 greatly differ from FIGS. 2 and 3 in the respect that a capacitor electrode 300DF as an upper electrode forming a capacitor electrode 70DF and the data line 6a are formed as the same film, that an interlayer film is accordingly increased, that is, one new layer, a "fourth interlayer insulating film 44" is provided, and that a relay electrode 719 is formed as the same film for a gate electrode 3aa. Accordingly, the modification includes, in sequential order from the TFT array substrate 10, a first layer including a lower light shielding film 11 used also as a scanning line, a second layer including a TFT 30 having a gate electrode 3aa, a third layer including a storage capacitor 70DF, a fourth layer including a data line 6a, etc., a fifth layer on which a shield layer 404 is formed, and a sixth layer (top layer) including the pixel electrode 9a, alignment film 16 and the like. Also, an underlying insulating film 12 is provided between the first layer and the second layer, a first interlayer insulating film 41 is provided between the second layer and the third layer, a second interlayer insulating film 42 is provided between the third layer and the fourth layer, a third interlayer insulating film 43 is provided between the fourth layer and the fifth layer, and a fourth interlayer insulating film 44 is provided between the fifth layer and the sixth layer, whereby short-circuiting between the elements as described is reduced or prevented.

In addition, each gate electrode 3aa is formed instead of the scanning line 3a, and a relay electrode 719 is formed as the same layer for the gate electrode.

In the second interlayer insulating film 42 positioned between the third layer and the fourth layer, contact holes 801 are formed, in the fourth layer, shield layer relay layers 6a1 are formed correspondingly to the contact holes 801, and in the third interlayer insulating film 43 positioned between the fourth layer and the fifth layer, contact holes 803 are formed. This electrically connects the shield layer 404 and the capacitor electrode 300DF by the contact holes 801, the shield layer relay layer 6a1, and the contact holes 803.

In FIG. 9, a relay electrode 719 is formed as the same film for the gate electrode 3aa, and the pixel electrode 9a and the first relay layer 71DF are electrically connected to the relay electrode 719.

More specifically, at first, electric connection to the pixel electrode 9a is performed by a second relay layer 6a2 and a third relay layer 406. Among them, the second relay electrode 6a2 is formed as the same film for the data line 6a and so as to fill in a contact hole 882 formed in the first and second interlayer insulating films 41 and 42 so as to reach the relay electrode 719. Also, the third relay layer 406 is formed as the same film for the shield layer 404 and so as to fill in a contact hole 804 formed in the third interlayer insulating film 43 so as to reach the relay layer 6a2.

Since, in this case, only the relay layer 406 has a possibility of electric corrosion with the ITO of the pixel electrode 9a, regarding the third relay layer 406, the configuration including an aluminum film and a titanium nitride film may be employed as described above. Also, depending on the circumstances, the shield layer 404 and the third relay layer 406 may be formed of ITO and the entire surface of the substrate may be formed solid, and for the second relay layer 6a2 and the shield layer relay layer 6a1 which may have electric corrosion with the ITO forming the above elements, a similar two-layered structure may be employed.

In addition, electric connection between the relay electrode 719 and the first relay layer 71DF is established by a contact hole 881 formed in the first interlayer insulating film 41. In other words, after the contact hole 881 is formed, a precursor film for the first relay layer 71DF is formed to fill in the contact hole 881, whereby electric connection between the first relay layer 71DF and the relay electrode 719 is realized.

From the foregoing, the first relay layer 71DF and the pixel electrode 9a are electrically connected by the relay electrode 719.

Although, in the above exemplary embodiment, the scanning line 3a is formed so that the gate electrode is included in the same plane, in this modification, for reserving an area where the relay electrode 719 is formed, the role of the scanning line is undertaken by the lower light-shielding film 11a in the above exemplary embodiment. In other words, the lower light-shielding film 11a in this modification is formed in a stripe form in a plan view so that the bottom of the groove 12cv forming the contact hole touches the lower light-shielding film 11a, whereby the scanning signal is supplied from the lower light-shielding film 11a to the gate electrode 3aa. Also, in an area in which the lower light-shielding film 11a crosses the data line 6a, an area projecting so that one corner of the pixel electrode 9a is rounded is formed.

Accordingly, the horizontal projection 3b in this modification fulfills a function of light shielding for the semiconductor layer 1a, and a function of supplying a signal to the gate electrode 3aa.

Also, as FIG. 8 shows, in a plane view, the relay electrode 719 is isolated so as to be positioned almost in the center of one side of each pixel electrode 9a. Since the relay electrode 719 and the gate electrode 3aa are formed as the same film, when the latter is formed of, for example, a conductive polysilicon film or the like, the former is also formed of the conductive polysilicon film or the like.

In this modification, similar to the above exemplary embodiment, as FIG. 9 shows, the storage capacitor is three-dimensionally formed. Specifically, in this modification, a projecting portion 71DFA is formed as part of the first relay layer 71DF, whereby the sectional shape of the storage capacitor 70DF includes a projecting shape. The first relay layer is formed of a single-layer film or a multi-layer film including light-absorbing conductive polysilicon and light-reflective metal or alloy. As shown in FIG. 10, the storage capacitor 70DF differs from that in FIG. 5 in that the first relay layer 71DF and the capacitor electrode 300DF exit only on the lower light-shielding film 11a (i.e., corresponding to the "scanning line 3a" in the above exemplary embodiment), but both exist also on the data line 6a and a three-dimensional portion is formed in any of the directions of the lower light-shielding film 11a and the data line 6a.

Also, in this modification described above, an operation and advantage obtained by the three-dimensional configuration of the storage capacitor 70DF can be enjoyed almost identically to those described in the above exemplary embodiment. In other words, an increase in capacitance can be achieved by the magnitude of the area of a side wall of the three-dimensional portion. In addition, according to this modification, compared with FIG. 5, it is clear that the effect of the increase in capacitance is large. This can realize an increase in storage capacitance, with a high aperture ratio maintained, whereby a high quality picture free from display non-uniformity, flickering, etc., can be displayed.

Also, in the storage capacitor 70DFA including the above three-dimensional portion, the projecting portion 43A as shown in FIG. 4 is formed in any of the directions of the lower light-shielding film 11a and the data line 6a. Thus, in the case of driving an electro-optical device having the above form by any of a 1H inversion driving method, a 1S inversion driving method, and a dot inversion driving method, based on a principle similar to that described above, a lateral electric field can be reduced or prevented from being generated, thus enabling display of a high quality picture.

It is obvious that, based on other operations and advantages obtained in the electro-optical device according to the above exemplary embodiment, that is, the presence of the shield layer 404, also the operation and advantage of excluding the influence of capacitive coupling between the data line 6a and the pixel electrode 9a can be almost identically enjoyed in this modification.

Also, in this modification, in particular, based on the formation of the relay electrode 719, the following operation and advantage can be obtained. In FIG. 3, etc., to establish electric connection between the TFT 30 and the pixel electrode 9a, as in the contact hole 85 in FIG. 3, it is required that the "top surface" in FIG. 3 of the first relay layer 71 which is a lower layer electrode and which forms the storage capacitor 70 is used to establish contact.

However, in the above form, in the step of forming the capacitor electrode 300 and the dielectric film 75, when a precursor film therefor is etched, a difficult production step must be implemented in which etching of the precursor film is executed with the first relay layer 71, which is positioned under the precursor film, normally left. In particular, as in the present invention, in the case of using a high dielectric constant material as the dielectric film 75, etching therefor is, in general, difficult, and a problem of disagreement between an etching rate in the capacitor electrode 300 and an etching rate in the high dielectric constant material, etc., occurs, so that the difficulty of the production step is increased. Therefore, in this case, it is highly possible that, in the first relay layer 71, so-called "projection" or the like occurs. Thus, in the worst case, there may be a possibility of short circuiting between the capacitor electrode 300 and the first relay layer 71 which constitute the storage capacitor 70, etc.

Accordingly, as in this modification, by providing an electric connecting point on the "bottom surface" in the figure of the first relay layer 71DF, electric connection between the TFT 30 and the pixel electrode 9a is realized, whereby the above problem does not occur. Because, as is clear in FIG. 9, this modification does not require a step in which the precursor film for the capacitor electrode 300DF and the dielectric film 75 is etched with the first relay layer 71DF left.

As described above, according to this modification, the above-described difficult etching step is not required. Thus, good electric connection between first relay layer 71DF and the pixel electrode 9a is realized. This is because the relay electrode 719 is used to realize the electric connection between both. In addition, based on the same reason, according to this modification, there is an extremely low possibility that short circuiting may occur between the capacitor electrode 300DF and the first relay layer 71DF. In other words, good formation of the storage capacitor 70DF, which is free from a defect, is possible.

Therefore, according to the establishment of the electric connection between the storage capacitor 70DF and the pixel electrode 9a, an area in which the storage capacitor must be formed can be easily reserved. Accordingly, the storage capacitor includes more three-dimensional portions. As a result, an operation and advantage of increasing capacitance can be effectively achieved (see FIGS. 2 and 5, and FIGS. 8 and 10 for comparison).

Since, in this modification, the capacitor electrode 300DF and the data line 6a are formed on separate layers, it is not required that electric insulation between both in the same plane be established. Therefore, in this modification, the capacitor electrode 300DF can be formed as part of a capacitor line extending in the direction of the lower light-shielding film 11a. Also, in order for the capacitor electrode 300DF to have a fixed potential, a form may be employed in which the capacitor line extends outside the picture display region 10a and is connected to a constant potential supply. Also, in this case, the capacitor line including the capacitor electrode 300DF itself can be separately connected to the constant potential supply, and the shield layer 404 itself can be separately connected to the constant potential supply. Thus, in the case of employing such a configuration, the contact holes 801 and 803 to electrically connect both are not always required.

As FIG. 9 shows, the dielectric film 75 has a two-layered structure composed of a lower silicon oxide film 75a and an upper silicon nitride film 75b, and is formed over the entire surface of the TFT array substrate 10. Also, another example of the dielectric film 75 may have a configuration in which the lower silicon oxide film 75a is formed over the entire surface of the TFT array substrate 10, and the upper silicon nitride film 75b is patterned so as to fall within the light shielding region (non-aperture region), whereby the transmittance is reduced or prevented from decreasing due to the presence of the silicon nitride film, which is colored.

The data line 6a, the shield-layer relay layer 6a1, and the second relay layer 6a2 may be formed as a film having a three-layered structure composed of an aluminum layer, a titanium nitride layer, and a silicon nitride layer in sequential order from bottom. The silicon nitride film may be patterned in a slightly large size so as to cover the lower aluminum layer and titanium nitride layer. Among these, the data line 6a includes aluminum that is a material having a relatively low resistance, whereby smooth supply of the picture signal to the pixel electrode 9a is realized. In addition, the silicon nitride film, which has a relatively good operation of stemming infiltration of moisture, is formed on the data line 6a, whereby an increase in the moisture resistance of the TFT 30 can be achieved, thus realizing extension of the TFT 30. It is preferable that the silicon nitride film be a plasma silicon nitride film.

Modification of Three-Dimensional Storage Capacitor

Although, in the foregoing, the three-dimensional portion of the storage capacitor 70DF is formed so as to be along both the lower light-shielding film 11a and the data line 6a, the present invention is not limited only to such an exemplary embodiment, but may have specific aspects of various types. The specific aspects are sequentially described below.

Figure 11:
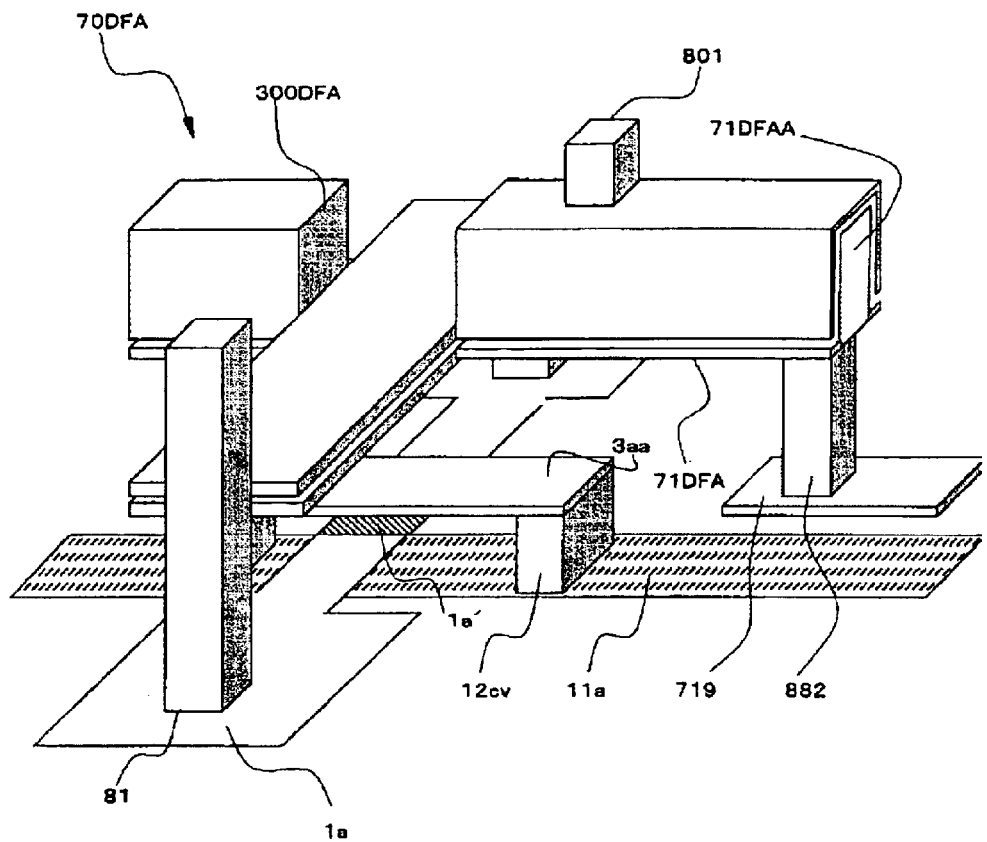
FIG. 11 is a perspective view which is similar in purpose to FIG. 10 and which shows an example in which the three-dimensional portion of a storage capacitor extends only in the direction of a lower light shielding film.

Firstly, as shown in, for example, FIG. 11, a storage capacitor 70DFA may be formed in which a projecting portion 71DFAA integrated with a first relay layer 71DFA is formed only in the direction of the lower light-shielding film 1a, and a dielectric film and a capacitor electrode 300DFA are formed on the projecting portion 71DFAA, whereby a three-dimensional portion is provided in the above direction.

By using a 1H inversion driving method to drive an electro-optical device according to this aspect, a lateral electric field can be reduced or prevented from being generated based on a principle similar to that described above, thus enabling display of a high quality picture.

Figure 12:
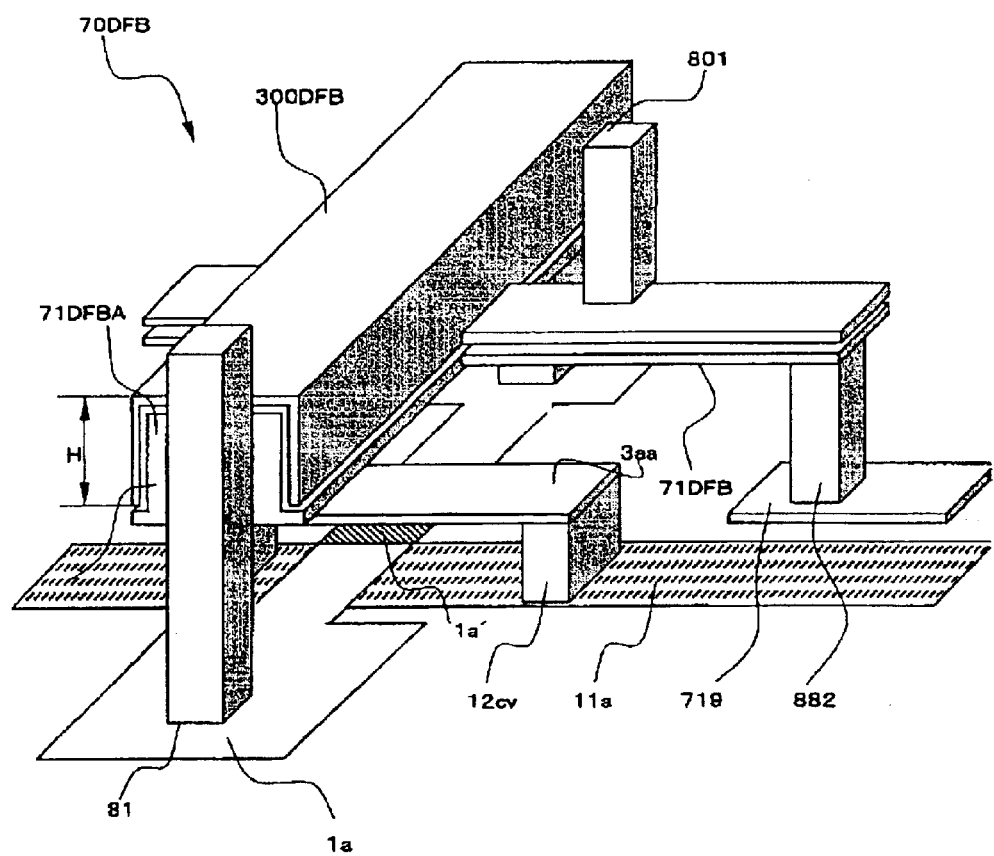
FIG. 12 is a perspective view which is similar in purpose to FIG. 10 and which shows an example in which the three-dimensional portion of a storage capacitor extends only in the direction of a data line.

Alternatively, as FIG. 12 shows, a storage capacitor 70DFB may be formed in which a projecting portion 71DFBA integrated with a first relay layer 71DFB is formed only in the direction of the data line 6a, and an dielectric film and a capacitor electrode 300DFB are formed on the projecting portion 71DFBA, whereby a three-dimensional portion is provided in the above direction.

Figure 13:
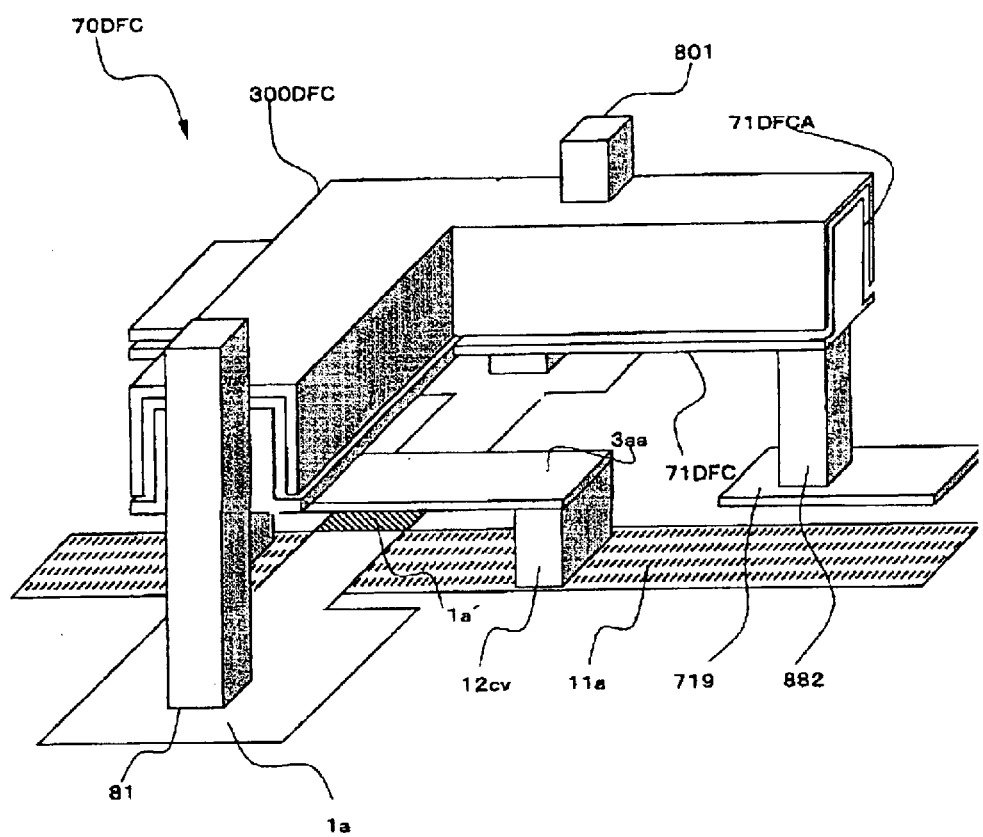
FIG. 13 is a perspective view which is similar in purpose to FIG. 10 and which shows an example in which three-dimensional portions of a storage capacitor extend, on the border of a direction in which a lower light shielding film extends, in one direction of a data line and in the direction in which the lower light shielding film extends.

Moreover, as FIG. 13 shows, a storage capacitor 70DFC may be formed in which a projecting portion 71DFCA integrated with a first relay layer 71DFC is formed in a direction in which the data line 6a extends and a direction in which the lower light-shielding film 11a extends, on the border of the direction in which the lower light-shielding film 11a extends, and a dielectric film and a storage capacitor 300DFC are formed on the projecting portion 71DFCA, whereby a three-dimensional portion is provided in each of the directions.

In any of the aspects in FIGS. 11 to 13, compared with the example of the related art in FIG. 6, etc., it is obvious that, although an increase in storage capacitance by the area of a side wall forming the three-dimensional portion is expected, the aperture ratio does not decrease, as in FIG. 5 or FIG. 10.

Figure 14:
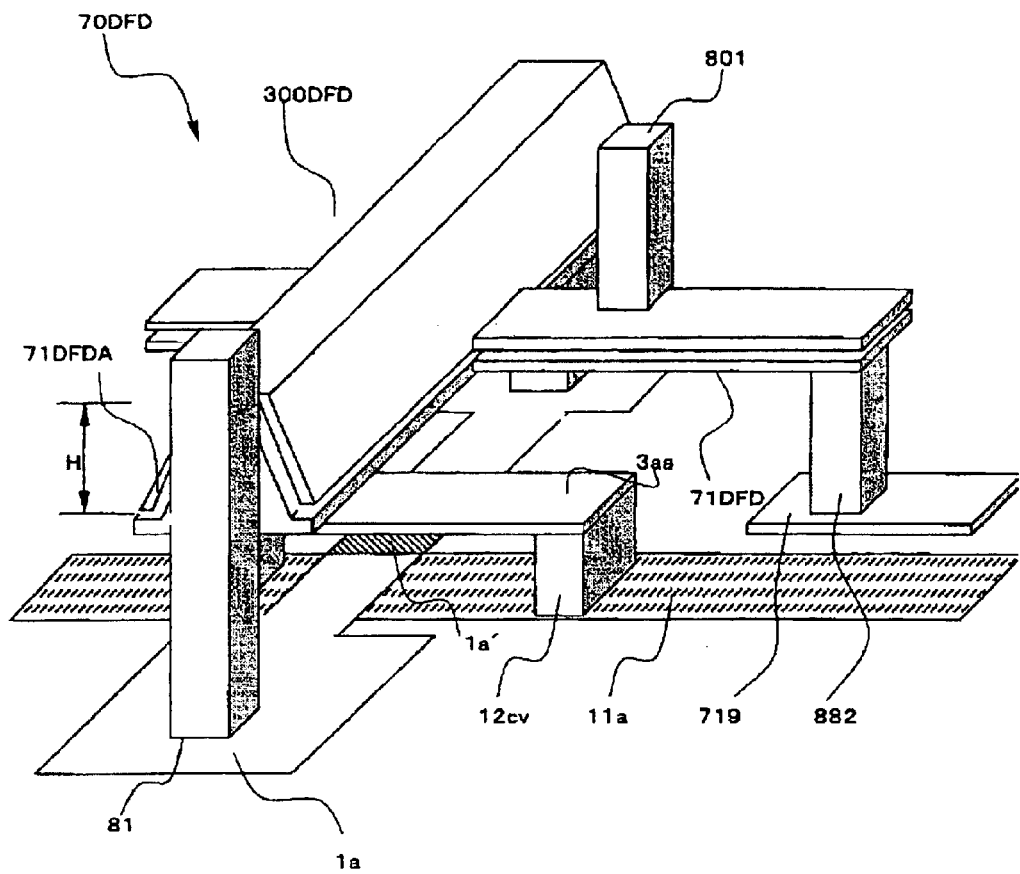
FIG. 14 is a perspective view which is similar in purpose to FIG. 10 and which shows an example of configuration in which a projecting shape, included in the sectional shape of a storage capacitor, is a tapered shape.

In the above modifications, the sectional shape including the projecting shape of the storage capacitor 70DF is rectangular. However, in an aspect of the present invention, a form may be employed in which the sectional shape is a tapered shape as shown in, for example, FIG. 14. More specifically, as shown in FIG. 13, the projecting portion 71DFDA integrated with the first relay layer 71 DFD has a sectional shape including a tapered shape, and the dielectric film and the capacitor electrode 300DFD are formed on the projecting portion 71DFDA, whereby a form in which the storage capacitor 70DFD, whose sectional shape includes a tapered shape, is established.

Also, in this case, it is obvious that, although an increase in storage capacitance by the area of a side wall forming the three-dimensional portion is expected, the aperture ratio does not decrease, as in FIG. 5 or FIG. 10. In particular, as is clear in FIG. 13, this form have no acute corner like the projecting portion 71DFA shown in FIG. 10, etc., and has each rounded corner. Thus, this enables good formation of the dielectric film and the capacitor electrode 300DFD on the projecting portion 71DFDA. This is because there is no need of concern about deterioration in coverage, etc., in the process of forming the dielectric film and the capacitor electrode 300DFD.

Although, in the above exemplary embodiment, the projecting portion 71DFA is formed in a form integrated with the first relay layer 71, the present invention is not limited to such a form. For example, a form may be employed in which a projecting member made of a material different from that for the first relay layer 71DF is provided below the first relay layer 71DF so as to function as a relay layer, and the first relay layer 71DF, the dielectric film 75, and the capacitor electrode 300DF are formed. In this case, the first relay layer 71DF may be either a thin film or a thick film.

Entire Configuration of Electro-Optical Device

Figure 15:
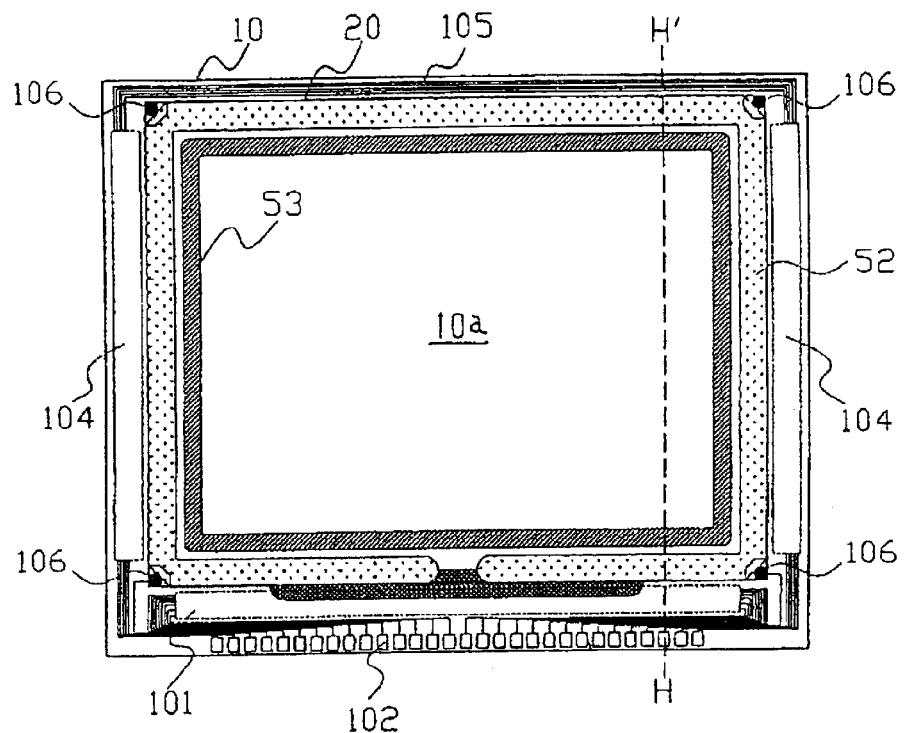
FIG. 15 is a plan view from the side of an opposing substrate which shows a TFT array substrate in an electro-optical device according to an exemplary embodiment of the present invention and components formed thereon.
Figure 16:
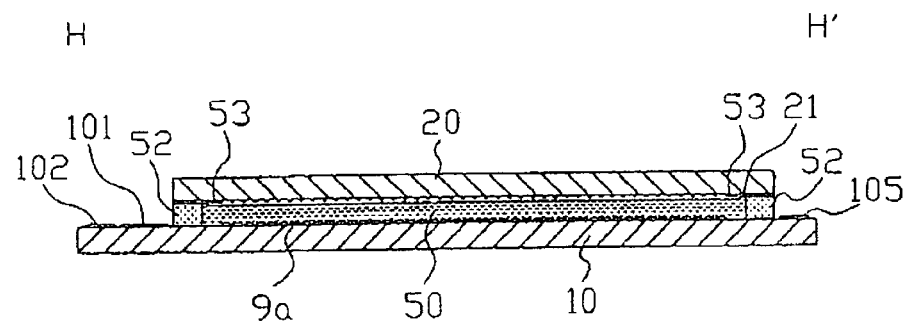
FIG. 16 is a sectional view taken along plane H–H' of FIG. 15.

The entire configuration of the above-described electro-optical device in each exemplary embodiment is described with reference to FIGS. 15 and 16. FIG. 15 is a plan view of the TFT array substrate and the components formed thereon viewed from the opposing substrate 20 side. FIG. 16 is a sectional view taken along the plane H–H' of FIG. 15.

In FIGS. 15 and 16, in the electro-optical device according to the exemplary embodiment, a TFT array substrate 10 and an opposing substrate 20 are disposed opposing each other. Liquid crystal 50 is encapsulated between the TFT array substrate 10 and the opposing substrate 20, and the TFT array substrate 10 and the opposing substrate 20 are bonded to each other by a sealing material 52 provided in a sealing area positioned around a picture display region 10a.

The sealing material 52 is formed of for example, ultraviolet curing resin, thermosetting resin, or the like in order to seal the substrate, and is cured by ultraviolet radiation, heating, or the like. Also, in the sealing material 52, when a liquid crystal device in the exemplary embodiment is a small liquid crystal device for enlarged display for a projector, a gap (intersubstrate gap) material (spacer) to set the distance between both substrates to a predetermined value, such as glass fibers or glass beads, are dispersed. Alternatively, when the liquid crystal device is a large liquid crystal device for original-sized display for use in a liquid crystal display or a liquid crystal television, the gap material may be included in the liquid crystal layer 50.

In an outer area of the sealing material 52, a data line driving circuit 101 that drives data lines 6a by supplying picture signals to the data lines 6a with predetermined timing, and an external circuit connecting terminal 102 are provided along one side of the TFT array substrate 10. Scanning line driving circuits 104 that drive scanning lines 3a by supplying scanning signals to the scanning lines 3a with predetermined timing are provided along two sides adjacent to the one side.

When a delay in the scanning signals supplied to the scanning lines 3a does not become a problem, it is obvious that only one scanning line driving circuit 104 is necessary. Also, two data line driving circuits 101 may be disposed along sides of the picture display region 10a.

Along the other one side of the TFT array substrate 10, a plurality of wires 105 to connect the scanning line driving circuits 104 provided along the two sides of the picture display region 10a are provided.

Also, in at least one of the corners of the opposing substrate 20, a conduction material 106 to establish electric conduction between the TFT array substrate 10 and the opposing substrate 20 is provided.

In FIG. 16, in the TFT array substrate 10, on pixel electrodes 9a on which TFTs for pixel switching, and wiring such as scanning lines and data lines are formed, an alignment film is formed. Also, on the opposing substrate 20, a common electrode 21, and an alignment film on the top are formed. The liquid crystal layer 50 is formed of liquid crystal which is, for example, a type of nematic liquid crystal or a mixture of types of nematic liquid crystal, and has a predetermined alignment state between a pair of the above alignment films.

On the TFT array substrate 10, in addition to the data line driving circuit 101, the scanning line driving circuit 104, etc., a sampling circuit to apply picture signals to the data lines 6a with predetermined timing, a precharging circuit to supply each of the plurality of data lines 6a with a precharging signal at a predetermined voltage level before the supply of the picture signals, a check circuit to check the electro-optical device for quality, a defect, etc., in the process of production and in shipping, may be formed.

Electronic Apparatus

Figure 17:
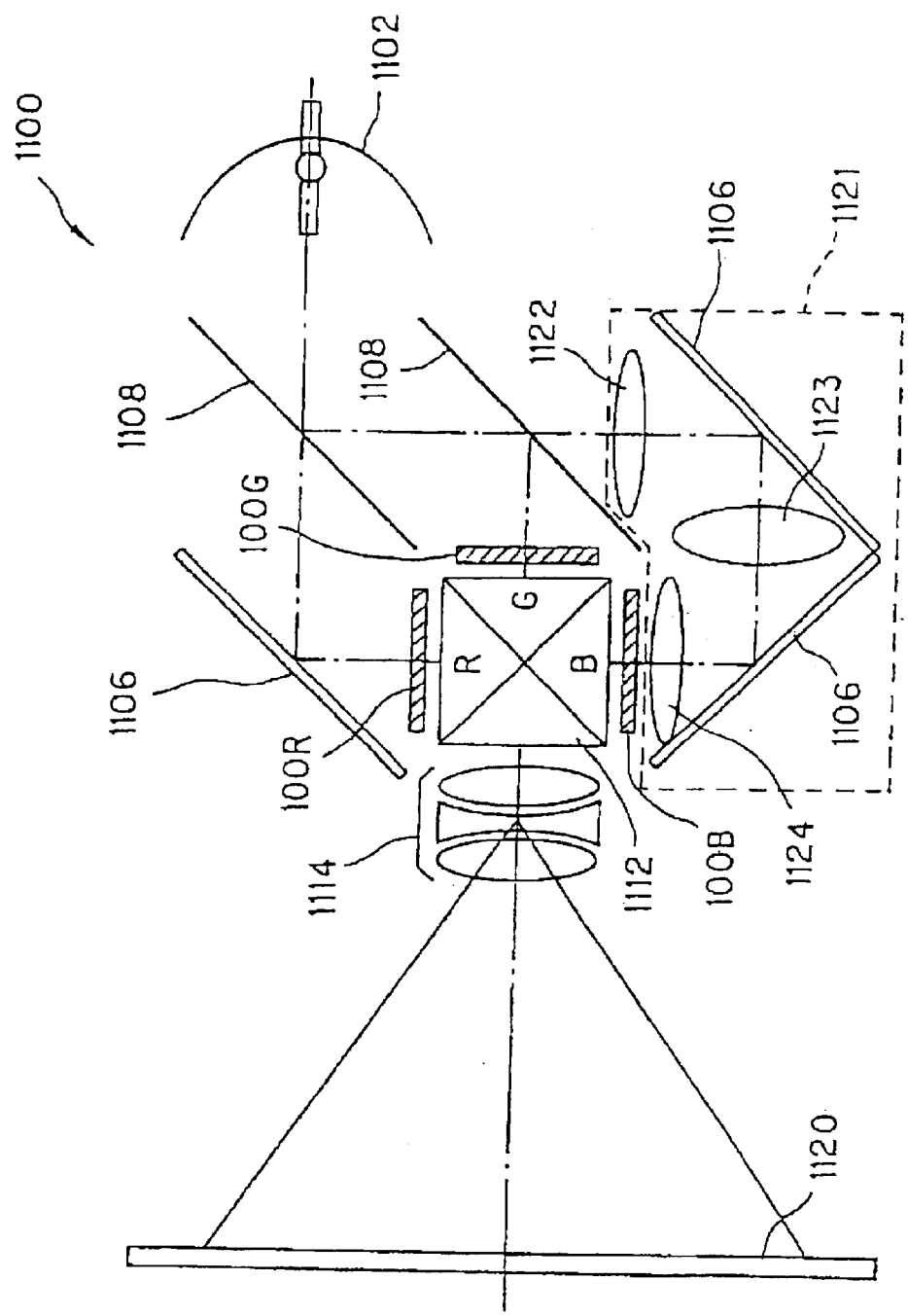
FIG. 17 is a schematic sectional view showing a color liquid crystal projector as an example of a projection color display apparatus according to an exemplary embodiment of an electronic apparatus of the present invention.

Next, regarding an exemplary embodiment of a projection color display device as an example of an electronic apparatus using the above electro-optical device described in detail as a light bulb, the entire configuration thereof, in particular, an optical configuration is described. FIG. 17 is a schematic sectional view of the projection color display device.

In FIG. 17, a liquid crystal projector 1100, as an example of the projection color display device according to this exemplary embodiment, is constituted as a projector in which three liquid crystal modules each including a liquid crystal device provided with a driving circuit on a TFT array substrate are provided and used as RGB light bulbs 100R, 100G, and 100B. In the liquid crystal projector 1100, projection light is emitted from a lamp unit 1102 which is a while light source, such as a metal halide lamp, and is separated by three mirrors 1106 and two dichroic mirrors 1108 into light components R, G, and B corresponding to three primary colors RGB. The components are respectively led to light bulbs 100R, 100G, and 100B corresponding to each color. At this time, in particular, the B light is led by a relay lens system 1121 including an incident lens 1122, a relay lens 1123, and an emergent lens 1124 in order to reduce or prevent optical deterioration due to a long optical path. Light components corresponding to the three primary colors, modulated by the light bulbs 100R, 100G, and 100B, are combined again by a dichroic prism 1112, and are subsequently projected as a color image on a screen 1120 by a projection lens 1114.

The present invention is not limited to the foregoing exemplary embodiments, but may be altered in the gist of the invention which can be read from the entirety of the appended claims and this specification, or in a range in which the inventive concept is not contradicted. Therefore, an electro-optical device and an electronic apparatus which include such alteration are also included in the technical scope of an aspect of the present invention. Regarding electro-optical devices, an aspect of the present invention can be applied to electrophoresis devices, EL (electroluminescent) devices, devices (Field Emission Display and Surface-Conduction Electron-Emitter Display) using electron emission elements, etc.

What is claimed is:

1. An electro-optical device, comprising:

data lines extending in a first direction above a substrate;

scanning lines extending in a second direction, the scanning lines crossing the data lines;

pixel electrodes and thin film transistors disposed so as to correspond to regions in which the data lines and the scanning lines cross;

storage capacitors electrically connected to the thin film transistors and the pixel electrodes; and a shield layer disposed between the data lines and the pixel electrodes, an upper electrode and a lower electrode between which a dielectric film forming each storage capacitor being supported include a first portion laminated along a plane parallel with one surface of the substrate and a second portion laminated along a plane that intersects the surface of the substrate at an angle, whereby the sectional shape of the capacitor includes a projecting shape.

2. The electro-optical device according to claim 1, the shield layer being electrically connected to the upper electrode of each storage capacitor.

3. The electro-optical device according to claim 1, the projecting shape being formed such that the lower electrode is formed so as to include a projecting portion from the substrate.

4. The electro-optical device according to claim 3, the lower electrode being formed of a light absorbing conductive material.

5. The electro-optical device according to claim 1, the projecting shape being formed by forming a projecting member below the lower electrode.

6. The electro-optical device according to claim 1, the projecting shape including a tapered shape.

7. The electro-optical device according to claim 1, the height of the projecting shape being 50 to 1000 nm.

8. An electro-optical device according to claim 1, the pixel electrodes being arranged in a matrix, and the scanning lines and the data lines being formed in light shielding regions corresponding to the matrix; and the storage capacitors being formed in the light shielding regions.

9. The electro-optical device according to claim 1, the projecting shape of each storage capacitor being formed along at least one of each scanning line and each data line.

10. The electro-optical device according to claim 1, the dielectric film constituting each storage capacitor including a plurality of layers including different materials, and constituting a laminated body including one of the layers which comprises a material having a dielectric constant higher than those of the other layers.

11. The electro-optical device according to claim 10, the dielectric film including a silicon oxide film and a silicon nitride film.

12. The electro-optical device according to claim 1, further comprising:

as part of the laminated structure, an interlayer insulating film disposed as a base for each pixel electrode, one surface of the interlayer insulating film being subjected to planarization processing.

13. A device according to claim 1, the second portion being laminated along a plane substantially orthogonal to the surface of the substrate.

14. A device according to claim 1, the second portion being laminated along a plane orthogonal to the surface of the substrate.

15. An electro-optical device comprising:

data lines extending in a first direction above a substrate;

scanning lines extending in a second direction, the scanning lines crossing the data lines;

pixel electrodes and thin film transistors disposed so as to correspond to regions in which the data lines and the scanning lines cross;

storage capacitors electrically connected to the thin film transistors and the pixel electrodes; and a light shielding film disposed between each data line and each pixel electrode, an upper electrode and a lower electrode between which a dielectric film forming each storage capacitor being supported include a first portion laminated along a plane parallel with one surface of the substrate and a second portion laminated along a plane that intersects the surface of the substrate at an angle, the sectional shape of the capacitor including a projecting shape.

16. A device according to claim 15, the second portion being laminated along a plane substantially orthogonal to the surface of the substrate.

17. A device according to claim 15, the second portion being laminated along a plane orthogonal to the surface of the substrate.

18. An electronic apparatus including an electro-optical device comprising:

data lines extending in a first direction above a substrate;

scanning lines extending in a second direction, the scanning lines crossing the data lines;

pixel electrodes and thin film transistors disposed so as to correspond to regions in which the data lines and the scanning lines cross;

storage capacitors electrically connected to the thin film transistors and the pixel electrodes; and a shield layer disposed between the data lines and the pixel electrodes, an upper electrode and a lower electrode between which a dielectric film forming each storage capacitor being supported include a first portion laminated along a plane parallel with one surface of the substrate and a second portion laminated along a plane that intersects the surface of the substrate at an angle, the sectional shape of the capacitor including a projecting shape.

19. A device according to claim 18, the second portion being laminated along a plane substantially orthogonal to the surface of the substrate.

20. A device according to claim 18, the second portion being laminated along a plane orthogonal to the surface of the substrate.

* * * * *